United States Patent
Endo et al.

(10) Patent No.: US 11,525,982 B2
(45) Date of Patent: Dec. 13, 2022

(54) LENS UNIT AND MANUFACTURING METHOD OF LENS UNIT

(71) Applicant: HOYA CORPORATION, Tokyo (JP)

(72) Inventors: Ken Endo, Saitama (JP); Takashi Igari, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 209 days.

(21) Appl. No.: 16/725,284

(22) Filed: Dec. 23, 2019

(65) Prior Publication Data

US 2020/0209549 A1 Jul. 2, 2020

(30) Foreign Application Priority Data

Dec. 28, 2018 (JP) .............................. JP2018-247242

(51) Int. Cl.
*G02B 13/00* (2006.01)
*C03B 11/08* (2006.01)
*G02B 7/04* (2021.01)
*G02B 3/00* (2006.01)

(52) U.S. Cl.
CPC ............ *G02B 13/002* (2013.01); *C03B 11/08* (2013.01); *G02B 3/00* (2013.01); *G02B 7/04* (2013.01)

(58) Field of Classification Search
CPC .......... G02B 13/002; G02B 7/04; G02B 3/00; G02B 19/0047; G02B 19/0014; G02B 7/022; G02B 7/02; G02B 1/041; C03B 11/08; C03B 2215/46; C03B 2215/72; C03B 2215/79; Y02P 40/57
USPC ....................................................... 359/642
See application file for complete search history.

(56) References Cited

U.S. PATENT DOCUMENTS

| | | | |
|---|---|---|---|
| 6,560,040 B2 * | 5/2003 | Kaneko | ................. G02B 7/022 |
| | | | 359/739 |
| 8,395,854 B2 | 3/2013 | Takakubo et al. | |
| 8,554,069 B2 | 10/2013 | Okuda | |
| 8,570,668 B2 | 10/2013 | Takakubo et al. | |
| 8,836,856 B2 | 9/2014 | Nomura | |
| 9,942,451 B2 | 4/2018 | Endo et al. | |

(Continued)

FOREIGN PATENT DOCUMENTS

| | | |
|---|---|---|
| JP | 2729702 B2 | 11/1991 |
| JP | 2001-350075 A | 12/2001 |

(Continued)

*Primary Examiner* — Thomas K Pham
*Assistant Examiner* — Henry A Duong
(74) *Attorney, Agent, or Firm* — Greenblum & Bernstein, P.L.C.

(57) ABSTRACT

A lens unit includes a positive lens element provided with a convex surface on an incident surface and/or an exit surface; and a lens frame supporting the lens element and being provided with a projection that projects in an inner radial direction from inside the lens frame. The lens frame supports the lens element with the projection fixedly fitted into an outer peripheral portion of the lens element. The projection is provided, on an inner peripheral portion thereof, with a first surface positioned on an incident side in an optical axis direction, a second surface positioned on an exit side in the optical axis direction, and a third surface positioned between the first surface and the second surface. The first, second and third surfaces are tapered surfaces that are respectively inclined relative to the optical axis direction. A method of manufacturing the lens unit is also provided.

6 Claims, 24 Drawing Sheets

(56) References Cited

U.S. PATENT DOCUMENTS

| 10,209,506 B2 | 2/2019 | Fujii et al. |
| 2002/0075573 A1 | 6/2002 | Kaneko et al. |
| 2015/0160438 A1 | 6/2015 | Okuda |
| 2017/0023762 A1* | 1/2017 | Tobita ................ G02B 27/0018 |
| 2017/0075109 A1* | 3/2017 | Chou .................... G02B 5/208 |
| 2017/0242324 A1* | 8/2017 | Kuroda ............... H04N 9/3144 |

FOREIGN PATENT DOCUMENTS

| JP | 2010-156905 A | 7/2010 |
| WO | 2016/051619 A | 4/2016 |

\* cited by examiner

LENS UNIT AND MANUFACTURING METHOD OF LENS UNIT

BACKGROUND OF THE INVENTION

1. Field of the Invention

The present disclosure relates to a lens unit and a manufacturing method thereof.

2. Description of Related Art

In an optical instrument such as an optical communication device or projector, etc., a lens unit, in which a lens element (or lens group) is fixedly supported inside a tubular lens frame, is used at a location to which light is distributed from a light source. The lens unit is mounted at a predetermined position relative to the light source, and light emitted (divergent light) from the light source condenses (focuses) at a predetermined position via the lens element of the lens unit.

In such a type of lens unit, it is demanded that the lens element be firmly supported inside the lens frame with high precision. Furthermore, if the space between the light source and the lens element is filled with an inert gas, or the like, there is also a demand for airtightness to be maintained between the lens element and the lens frame. In order to meet such demands, a structure having increased lens-element support (retention) is known in which a projection formed on an inner periphery of the lens frame fit-engages with an outer periphery of the lens element.

Furthermore, in a lens unit, only light distribution of effective light rays that properly pass within the effective apertures of the incident surface and exit surface of the lens element are desired. Whereas, since light other than effective light rays, such as peripheral light, reflection light and stray light, etc., become a cause of ghosting, etc., various techniques have been proposed in order to shield (shut out) such harmful light using part of the lens frame.

The above-mentioned related arts are disclosed in the following documents.

Patent Literature 1: Japanese Unexamined Patent Publication No. 2010-156905
Patent Literature 2: Japanese Unexamined Patent Publication No. 2001-350075
Patent Literature 3: Japanese Patent No. 2,729,702
Patent Literature 4: International Patent Publication No. WO2016-051619

The demand for further miniaturization and improvement in optical performance of lens units has increased in recent years. Specifically, improvements in positional precision and joining strength between the lens frame and the lens element are demanded, as well as the demand for suppression of harmful light rays. Furthermore, improvement in manufacturability of lens units is also demanded.

SUMMARY OF THE INVENTION

In view of the aforementioned problems, the illustrated embodiment of the invention provides a lens unit that possesses superior positional precision and joining strength between a lens frame and a lens element. The illustrated embodiment of the invention also provides a lens unit possessing superior optical performance in which harmful light rays are prevented. A manufacturing method of a lens unit is also disclosed which is superior in manufacturability.

According to an embodiment of the invention, a lens unit including a lens element provided with a convex surface on at least one of an incident surface and an exit surface of the lens element, the lens element having a positive refractive power that condenses light rays, emitting from a light source, at a predetermined position; and a lens frame that supports the lens element within the lens frame, the lens frame provided with a projection that projects in an inner radial direction from an inner portion of the lens frame. The lens frame supports the lens element with the projection fixedly fitted into an outer peripheral portion of the lens element. The projection is provided, on an inner peripheral portion thereof, with a first surface positioned on an incident side in an optical axis direction of the lens element, a second surface positioned on an exit side in the optical axis direction, and a third surface positioned between the first surface and the second surface. The first, second and third surfaces are tapered surfaces that are respectively inclined relative to the optical axis direction.

According to the above-described embodiment of the lens unit, since the projection in the lens frame is provided with first through third surfaces that incline relative to the optical axis direction, the precision and strength of support (retention) of the lens element that is supported (held/retained) by the projection can be improved. Furthermore, the projection in the lens frame shields light that passes outside the effective aperture diameter of the lens element, thereby improving optical performance.

By appropriately determining the orientation and shape of the tapered surfaces that define the projection in the lens frame, the optical performance can be further improved. For example, it is desirable to determine the relative position and shape of the exit surface and the third surface so that light rays that are incident from the incident surface and reflect off the third surface are totally reflected by the exit surface. Accordingly, the projection does not just merely shield unwanted and harmful peripheral light, but also prevents light that is reflected off the projection itself from exiting the lens element.

It is desirable for the third surface of the projection to have a progressively reduced inner diameter toward a surface having a largest convex curvature out of the incident surface and the exit surface.

In the projection in the lens frame, the first surface may have a progressively reduced inner diameter from the incident side to the exit side, the second surface may have a progressively reduced inner diameter from the exit side to the incident side, and the third surface may have a progressively reduced inner diameter from the incident side to the exit side. An inclination of the third surface relative to the optical axis direction can be different from that of the first surface. Alternatively, it is also possible for the third surface to have a progressively reduced inner diameter from the exit side to the incident side, and for an inclination of the third surface relative to the optical axis direction to be different from that of the second surface.

The lens frame may be provided, on an inner surface thereof, with a reflection control portion between the light source and the lens element with respect to the optical axis direction, wherein light rays from the light source are reflected by the reflection control portion and travel toward the projection. Accordingly, reflected light rays that reflect from the inner surface of the lens frame before entering the lens element can also be effectively shielded (shut out), to thereby further improve the optical performance of the lens unit.

It is desirable, as a method of manufacturing the above-described lens unit, to place the lens frame into a press-molding apparatus with the lens frame oriented so that an end of the third surface that has a smaller inner diameter than the other end, with respect to the optical axis direction, is positioned downward; to place a glass preform onto the third surface; and to press-mold the glass preform using an upper die and a lower die of the press-molding apparatus to form the lens element. Since the glass preform can be supported by the third surface, which has a progressively reduced diameter in a downward direction, before the glass preform is molded (press-molded), the relative position between the glass preform and the lens frame can be determined with high precision from a preparatory stage of a pressing operation and during the pressing operation itself.

In the method of manufacturing the above-described lens unit, it is desirable for a molding surface for molding one surface having a largest convex curvature out of the incident surface and the exit surface of the lens element to be formed on the lower die, and a molding surface for molding the other surface of the incident surface and the exit surface of the lens element to be formed on the upper die. By providing the molding surface, for molding the surface of the lens that has a larger convex curvature, in the lower die (lower mold), positional precision and stability of the glass preform during the press-molding operation using the upper and lower dies can be improved.

As described above, according to the lens unit of the present disclosure, the positional precision and joining strength between the lens frame and the lens element can be improved. Furthermore, according to the lens unit of the present disclosure, optical performance is improved by using a simple structure to prevent harmful light rays from passing through the lens element.

Furthermore, according to the present disclosure of the method of manufacturing the lens unit, productivity of the lens unit which supports (holds) a lens element within a lens frame can be improved.

The present disclosure relates to subject matter contained in Japanese Patent Application No. 2018-247242 (filed on Dec. 28, 2018) which is expressly incorporated herein in its entirety.

BRIEF DESCRIPTION OF THE DRAWINGS

The present invention will be discussed below in detail with reference to the accompanying drawings, in which.

DESCRIPTION OF THE EMBODIMENTS

Figure 1:
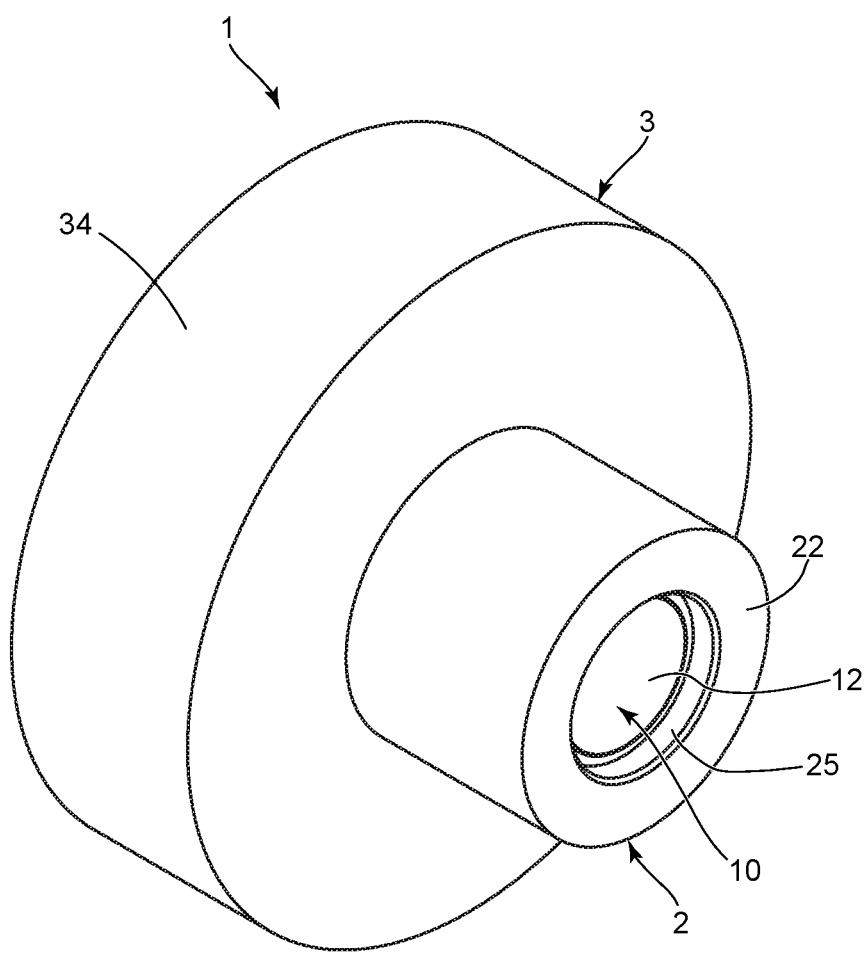
FIG. 1 shows a perspective view of an optical device provided with a lens unit according to a first embodiment.
Figure 2:
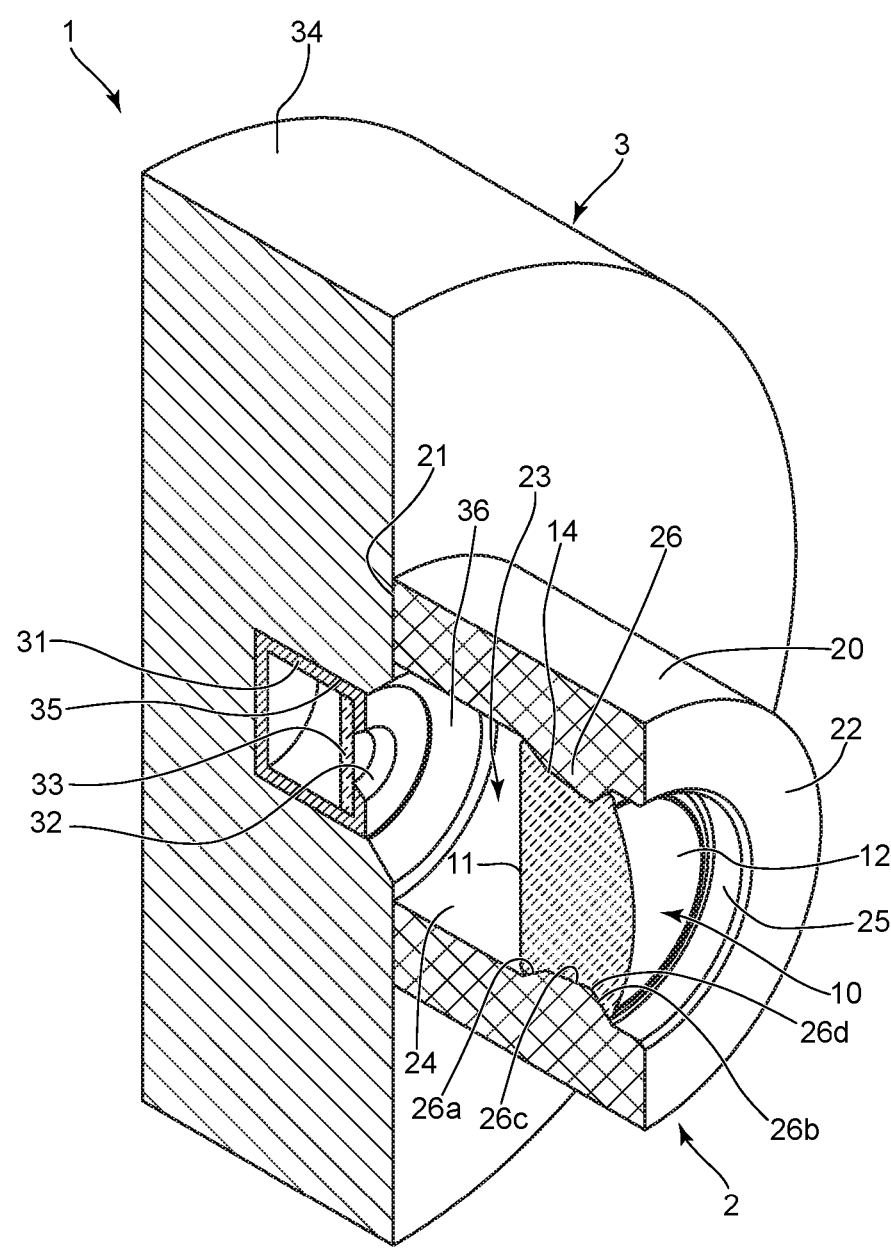
FIG. 2 is a cross-sectional perspective view taken along the optical axis of the optical device that is provided with the lens unit according to the first embodiment.

A lens unit 2 according to a first embodiment will be hereinafter discussed with reference to FIGS. 1 through 7. The lens unit 2 is combined with a light source unit 3 to form an optical device 1. The optical device 1 is used in a light distribution portion of an optical instrument such as a projector, an optical information-reading apparatus, or an optical communication apparatus, etc.

The lens unit 2 is formed from a lens element 10 and a lens frame 20. The lens element 10 has a positive refractive power and constitutes (at least part of) a converging optical system (condensing optical system/focusing optical system)

which converges light, emitted from a light source 30 of the light source unit 3, at a predetermined position (a point of focus).

The lens element 10 is a single lens element made from a glass material. The lens element 10 has a profile (shape) that is rotationally symmetrical about optical axis 10x. Hereinafter, a direction that extends along the optical axis 10x will be referred to as an "optical axis direction". With respect to the optical axis direction, an "incident side" is defined as facing toward the light source 30 in the optical axis direction, and an "exit side" is defined as facing away from (in an opposite direction from) the light source 30 in the optical axis direction. Furthermore, with respect to a radial direction about the optical axis 10x, a radial direction toward the optical axis 10x will be herein referred to as an "inner radial direction" and a radial direction extending an opposite direction away from the optical axis 10x will be herein referred to as an "outer radial direction".

The lens element 10 is provided with an incident surface 11 on the incident side thereof, and with an exit surface 12 on the exit side thereof. The incident surface 11 is a flat surface orthogonal to the optical axis 10x. The exit surface 12 is a convex surface convexing toward (protruding toward) the exit side. In other words, the lens element 10 is a plano-convex lens. An exit peripheral rim surface 13 is formed at a peripheral annular region of the exit surface 12. The exit peripheral rim surface 13 is approximately perpendicular (orthogonal) to the optical axis 10x.

Figure 5:
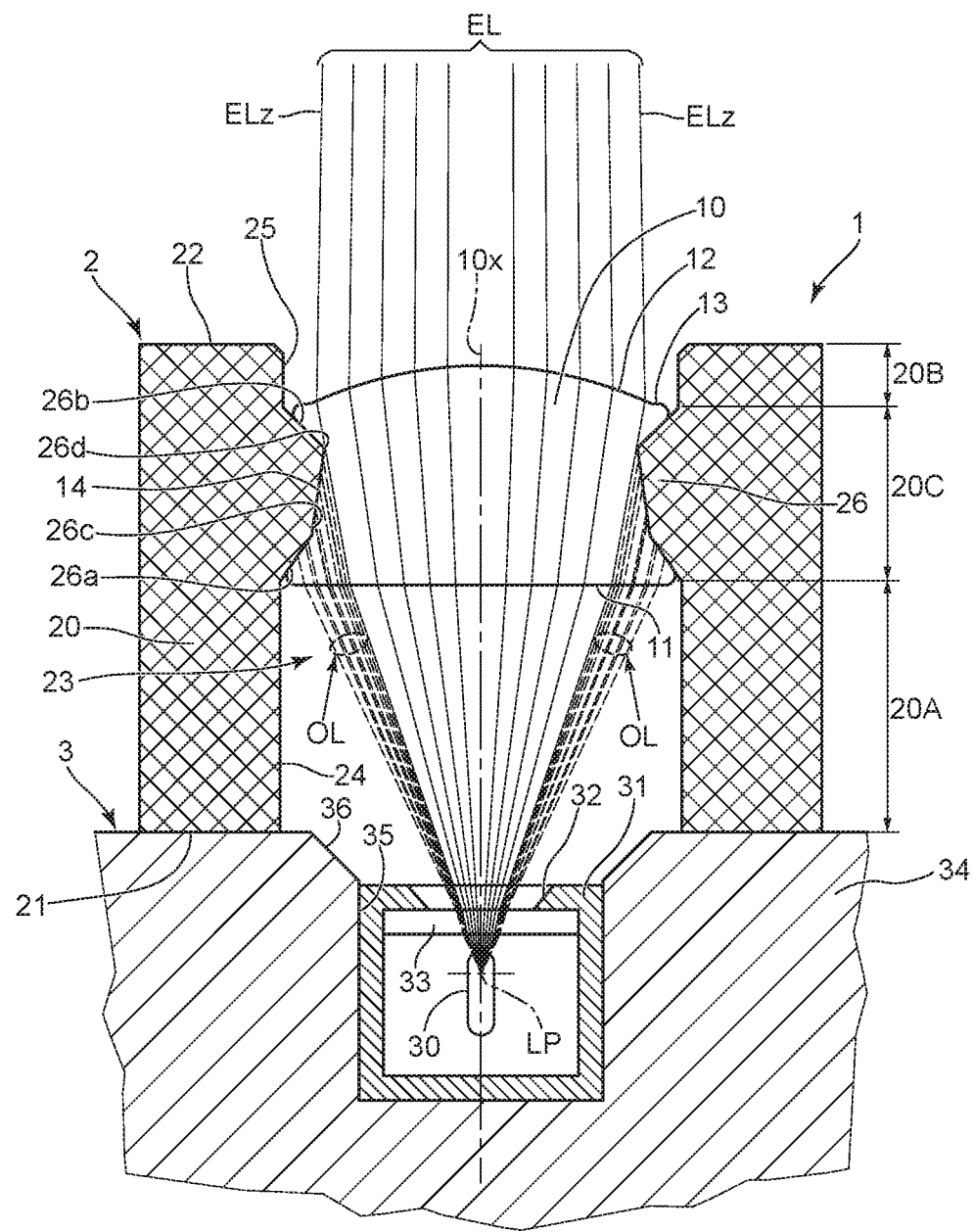
FIG. 5 is a cross-sectional view, of the lens unit according to the first embodiment, illustrating the shielding of peripheral light rays by the lens unit.

With respect to the lens element 10, the areas through which effective light rays EL shown in FIG. 5 pass define an effective aperture on the incident side and an effective aperture on the exit side, respectively. The effective aperture on the exit side lies within the range defined (formed) by the exit surface 12. The exit peripheral rim surface 13 is a portion needed for when the lens element 10 is formed (molded), which is discussed further below. The exit peripheral rim surface 13 does not function as an effective lens surface. The effective aperture of the exit surface 12 is larger than the effective aperture of the incident surface 11.

A radially-outer peripheral part of the lens element 10 is provided with an outer peripheral recess (outer peripheral depression) 14 having a shape that is recessed in the inner radial direction. When the lens element 10 is formed (press-molded), which is discussed further below, the outer peripheral recess 14 is formed by a projection 26 (the details of which will be discussed below), which constitutes part of the lens frame 20.

The lens frame 20 is a metal tubular body having a central axis extending in the optical axis direction. The lens frame 20 is provided with an incident end 21 at the incident side (with respect to the lens element 10), and an exit end 22 at the exit side (with respect to the lens element 10). Both of the incident end 21 and the exit end 22 are flat surfaces lying orthogonal to the optical axis 10x. A through-hole 23 is formed through the lens frame 20 and extends from the incident end 21 through to the exit end 22 in the optical axis direction.

Figure 3:
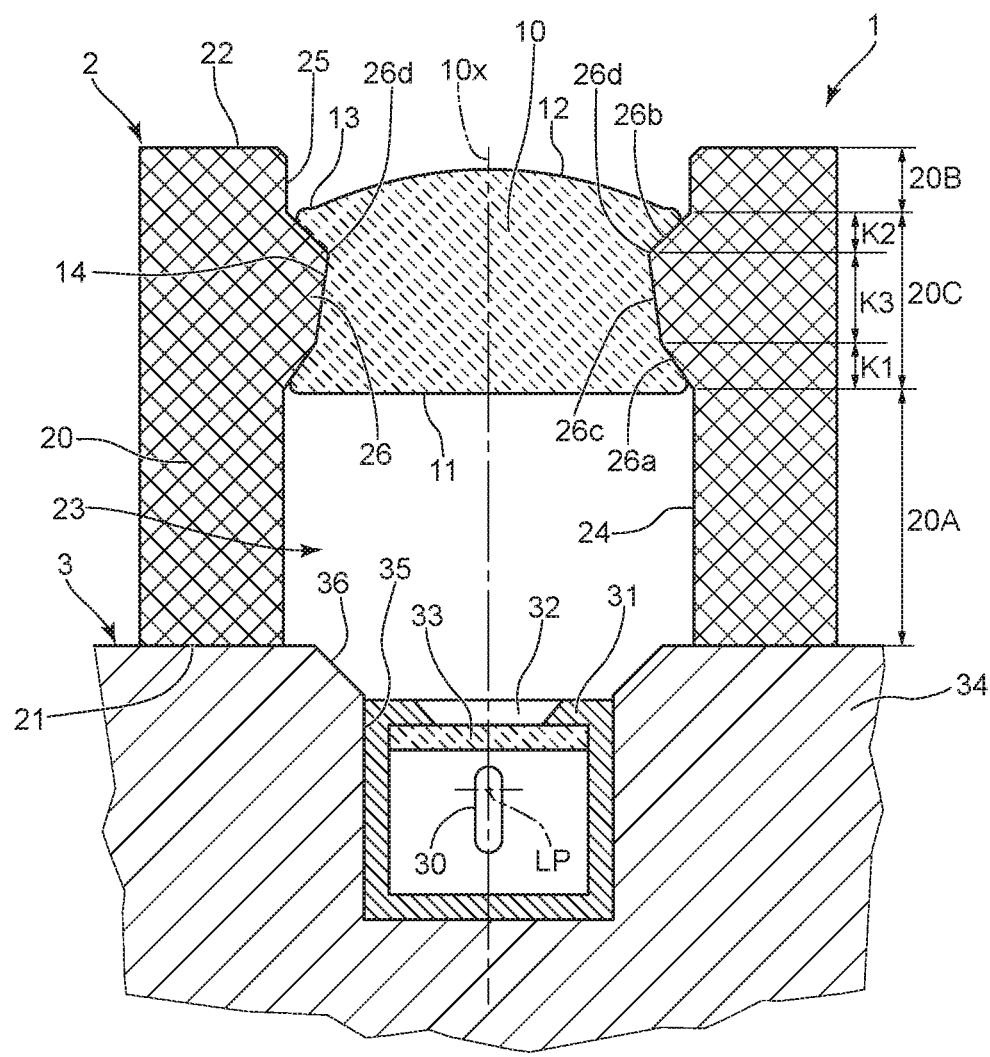
FIG. 3 is a cross-sectional view of main components of an optical device that is provided with the lens unit according to the first embodiment.

The outer peripheral surface of the lens frame 20 has a smooth cylindrical shape; however, due to differences in the inner peripheral shape (profile) of the through-hole 23, the lens frame 20 is divided (defined) by three sections with respect to the optical axis direction. Specifically, as shown in FIG. 3, the lens frame 20 is defined by an incident-side section 20A that is located towards the incident end 21, an exit-side section 20B that is located towards the exit end 22, and an intermediate section 20C that is located between the incident-side section 20A and the exit-side section 20B.

An inner surface of the incident-side section 20A that defines part of the through-hole 23 (within the incident-side section 20A) is formed as a cylindrical surface 24 (inner cylindrical surface) having a uniform profile (constant diameter) along the optical axis direction. The inner diameter of the cylindrical surface 24 is slightly larger than the outer diameter of the incident surface 11 of the lens element 10.

An inner surface of the exit-side section 20B that defines another part of the through-hole 23 (within the exit-side section 20B) is formed as a cylindrical surface 25 (inner cylindrical surface) having a uniform profile (constant diameter) along the optical axis direction. The inner diameter of the cylindrical surface 25 is slightly larger than the outer diameter of the exit peripheral rim surface 13 of the lens element 10.

The intermediate section 20C is provided with the projection 26, which projects in an inner radial direction relative to the cylindrical surface 24 and the cylindrical surface 25. The projection 26 is continuously provided (without discontinuing) around the entire inner circumference of the lens frame 20 and has a cross-sectional shape, as shown in FIGS. 2 through 7, at all positions in the circumferential direction. The projection 26 is provided with a first tapered surface (first surface) 26a that connects with the exit end of the cylindrical surface 24, a second tapered surface (second surface) 26b that connects with the incident end of the cylindrical surface 25, and a third tapered surface (third surface) 26c connected between the first tapered surface 26a and the second tapered surface 26b.

Each of the first tapered surface 26a, the second tapered surface 26b, and the third tapered surface 26c has a conic shape (defining part of a conic surface) centered about the optical axis 10x. The first tapered surface 26a has a progressively reduced inner diameter from the cylindrical surface 24 (the incident side) toward the exit side. The second tapered surface 26b has a progressively reduced inner diameter from the cylindrical surface 25 (exit side) toward the incident side. The third tapered surface 26c has a progressively reduced inner diameter from the first tapered surface 26a (incident side) toward the second tapered surface 26b (exit side). In other words, the first tapered surface 26a and the third tapered surface 26c are tapered surfaces that have a gradually decreasing inner diameter toward the exit side, and the second tapered surface 26b is a tapered surface that has a gradually decreasing inner diameter toward the incident side.

The inclination angle of the first tapered surface 26a relative to the optical axis 10x is greater than that of the third tapered surface 26c. In addition, ignoring the fact that the inclination directions are opposite to each other, the inclination angle of the second tapered surface 26b relative to the optical axis 10x is greater than that of the first tapered surface 26a. In terms of ranges occupied in the optical axis direction, as shown in FIG. 3, a range K2 in which the second tapered surface 26b is formed is the narrowest, a range K3 in which the third tapered surface 26c is formed is the widest, and a range K1 in which the first tapered surface 26a is formed has an intermediate width. A maximum projecting portion (maximum projecting point) 26d, which projects the most in the inner radial direction out of (all other positions in the optical axis direction of) the projection 26, is positioned at a boundary defined between the second tapered surface 26b and the third tapered surface 26c. The position of the maximum projecting portion 26d is located toward the exit side relative to a central position in the optical axis direction of the intermediate section 20C.

The lens element 10 is accommodated within the through-hole 23 and integrally formed with the lens frame 20 with the projection 26 fixedly fitted into the outer peripheral recess 14. The outer peripheral recess 14 has an inner surface shape including three tapered surfaces that respectively correspond to the three tapered surfaces 26a, 26b and 26c that form (define) the projection 26. Accordingly, the projection 26 fit-engages with the outer peripheral recess 14 to thereby integrally connect the lens element 10 and the lens frame 20 with each other. This type of joining structure (mated structure) is achieved by forming the lens element 10 while being embedded in the lens frame 20.

The exit peripheral rim surface 13 of the lens element 10 is positioned near or at a boundary between the exit-side section 20B and the intermediate section 20C with respect to the optical axis direction. The length in the optical axis direction of the exit-side section 20B of the lens frame 20 is set to a larger length than the protruding amount (convexing amount) of the exit surface 12 from the exit peripheral rim surface 13 of the lens element 10. In other words, the exit end 22 of the lens frame 20 is positioned further toward the exit side than the exit surface 12 of the lens element 10. Furthermore, the incident surface 11 of the lens element 10 is positioned near, or at, a boundary between the incident-side section 20A and the intermediate section 20C with respect to the optical axis direction. Accordingly, the entire lens element 10 is accommodated within the through-hole 23 in the optical axis direction. The incident-side section 20A of the lens frame 20 functions as a spacer that determines (defines) a distance in the optical axis between the incident surface 11 of the lens element 10 and the light source 30.

The light source unit 3 is provided with an internal body 31 that accommodates the light source 30 therein. An aperture portion 32 is formed in the internal body 31, and an inner side of the aperture portion 32 is covered with a transparent cover glass 33. An outer body 34, having a larger diameter than that of the lens frame 20, is provided on the outer side of the internal body 31. The internal body 31 is fixedly fitted into an accommodation portion 35 that is formed in the outer body 34.

The outer body 34 is provided with a conical shaped light-source peripheral-edge surface 36 which has a gradually increasing aperture diameter from the accommodation portion 35 toward the outer surface. The lens unit 2 and the light source unit 3 are assembled together by abutting the incident end 21 of the lens frame 20 against the outer body 34 at the outer periphery of the light-source peripheral-edge surface 36. The lens unit 2 and the light source unit 3 are aligned and mutually fixed so that a predetermined positional relationship is obtained between the lens element 10 and the light source 30. In a state where the lens unit 2 and the light source unit 3 assembled together and mutually fixed, the inside (the internal space at the incident side of the lens element 10) of the lens frame 20 is filled with inert gas.

In the lens unit 2, the structure that holds the lens element 10 by the three tapered surfaces 26a, 26b and 26c of the projection 26 of the lens frame 20 coming in contact with the lens element 10 is superior in joining strength, positional precision, load bearing and air-tightness. Since each of the three tapered surfaces 26a, 26b and 26c is non-parallel and non-orthogonal relative to the optical axis 10x, each of the three tapered surfaces 26a, 26b and 26c can function as a positional reference for both the optical axis direction and the radial direction, and can receive loads acting in both the optical axis direction and the radial direction. Furthermore, due to the tapered surfaces 26a, 26b and 26c constituting complex tapered surfaces having mutually different inclination angles and being in contact with the lens element 10, the air-tightness between the projection 26 and the outer peripheral recess 14 is improved (increased). In particular, in addition to the first tapered surface 26a and the second tapered surface 26b that form the projection profile of the projection 26, adjacent to the cylindrical surfaces 24 and 25, the third tapered surface 26c that is positioned between the first and second tapered surfaces 26a and 26b also can achieve the above-described advantageous effects over the entire projection 26 by being inclined relative to the optical axis 10x.

Figure 4:
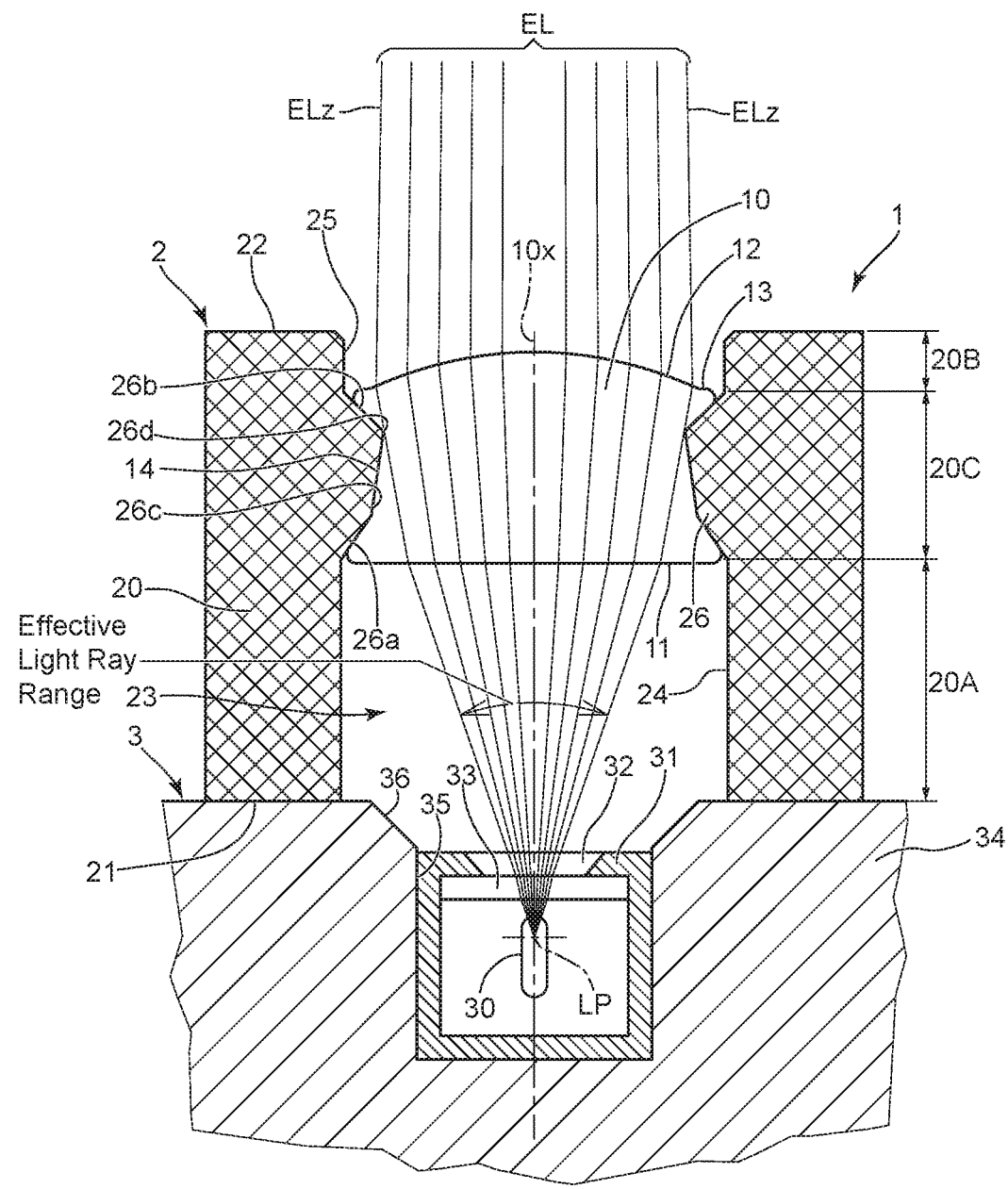
FIG. 4 is a cross-sectional view, of the lens unit according to the first embodiment, illustrating effective light rays in the lens unit.
Figure 6:
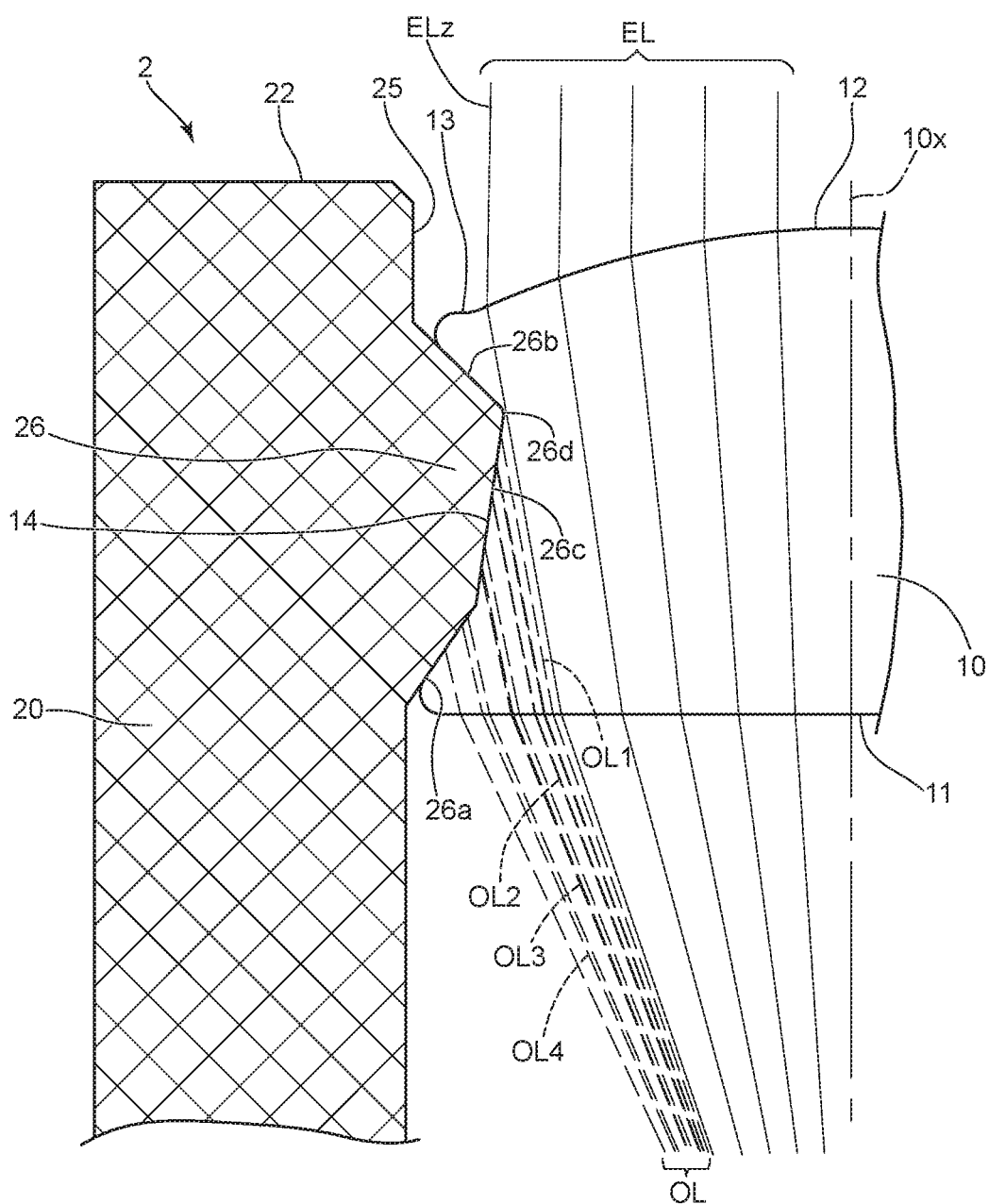
FIG. 6 is an enlarged sectional view of part of FIG. 5.

The optical device 1 is constructed in the above-described manner. Light emitted from the light source 30 is diverged and travels toward the lens element 10, and is converged (focused) at a predetermined converging position by the positive refractive power of the lens element 10. Light rays travelling from light-emission point LP of the light source 30 are schematically shown in FIGS. 4 through 7. Out of the light rays that originate from the light-emission point LP, the effective light rays EL that pass within the effective apertures of the incident surface 11 and the exit surface 12 without being reflected, etc., by the lens frame 20 are shown in FIGS. 4 through 6. Out of the effective light rays EL, the light rays that pass through both the incident surface 11 and the exit surface 12 at a maximum position away from the optical axis 10x are referred to as outermost effective light rays ELz. The distances in the radial direction from the optical axis 10x to the outermost effective light rays ELz at the incident surface 11 and at the exit surface 12 respectively define the effective apertures thereof.

As shown in FIGS. 4 through 6, the outermost effective light rays ELz pass at a close proximity of the maximum projecting portion 26d that projects by a maximum amount in the inward radial direction of the lens frame 20. The projection 26 does not obstruct the outermost effective light rays ELz and functions as a light shield that shields light that passes on the outer radial side of the outermost effective light rays ELz travelling toward the exit side.

Peripheral light rays OL which are incident on the lens element 10 from the outer side of the effective aperture of the incident surface 11 and pass on the outer radial side of the outermost effective light rays ELz of the effective light rays EL are shown in FIGS. 5 and 6. The peripheral light rays OL are obstructed by the projection 26 so that the peripheral light rays OL cannot travel any further therefrom and not exit from the lens element 10. For example, peripheral light ray OL1 shown in FIG. 6 is a light ray that is incident outside the effective aperture of the incident surface 11 and heads toward a boundary portion between the exit surface 12 and the exit peripheral rim surface 13. Peripheral light ray OL2 is a light ray that is incident outside the effective aperture of the incident surface 11 and heads toward the exit peripheral rim surface 13. Peripheral light ray OL3 is a light ray that is incident outside the effective aperture of the incident surface 11 and heads toward an outermost peripheral portion of the exit peripheral rim surface 13. The third tapered surface 26c of the projection 26 is positioned on extension lines of the peripheral light rays OL1, OL2 and OL3 so that further travel of each of the peripheral light rays OL1, OL2 and OL3 is obstructed (prevented) by the third tapered surface 26c of the projection 26. Furthermore, the first tapered surface 26a of the projection 26 is positioned on an extension line of peripheral light ray OL4 that is incident outside the effective aperture of the incident surface 11 and heads toward a position radially outside the exit peripheral rim surface 13, so that further travel of the peripheral light ray OL4 is obstructed (prevented) by the first tapered surface 26a of the projection 26.

Accordingly, the projection 26 provided in the lens frame 20 is positioned on the travelling path (light path) of the peripheral light rays OL, which try to travel along a radially outer side of the exit surface 12, so that the projection 26 obstructs (shields) the peripheral light rays OL. In the projection 26, the maximum projecting portion 26d is determined (defined) at a boundary between the second tapered surface 26b and the third tapered surface 26c, which respectively incline relative to the optical axis 10x, and light rays that are allowed to pass through the lens element 10 (outermost effective light rays ELz) and light rays that are shielded (peripheral light rays OL) are managed (determined) by the position of the maximum projecting portion 26d. By determining the light-shielding boundary at a specified point such as at the maximum projecting portion 26d, precise management of the shielding effect attained by the projection 26 is facilitated, and light shielding can be achieved at a high precision.

Figure 7:
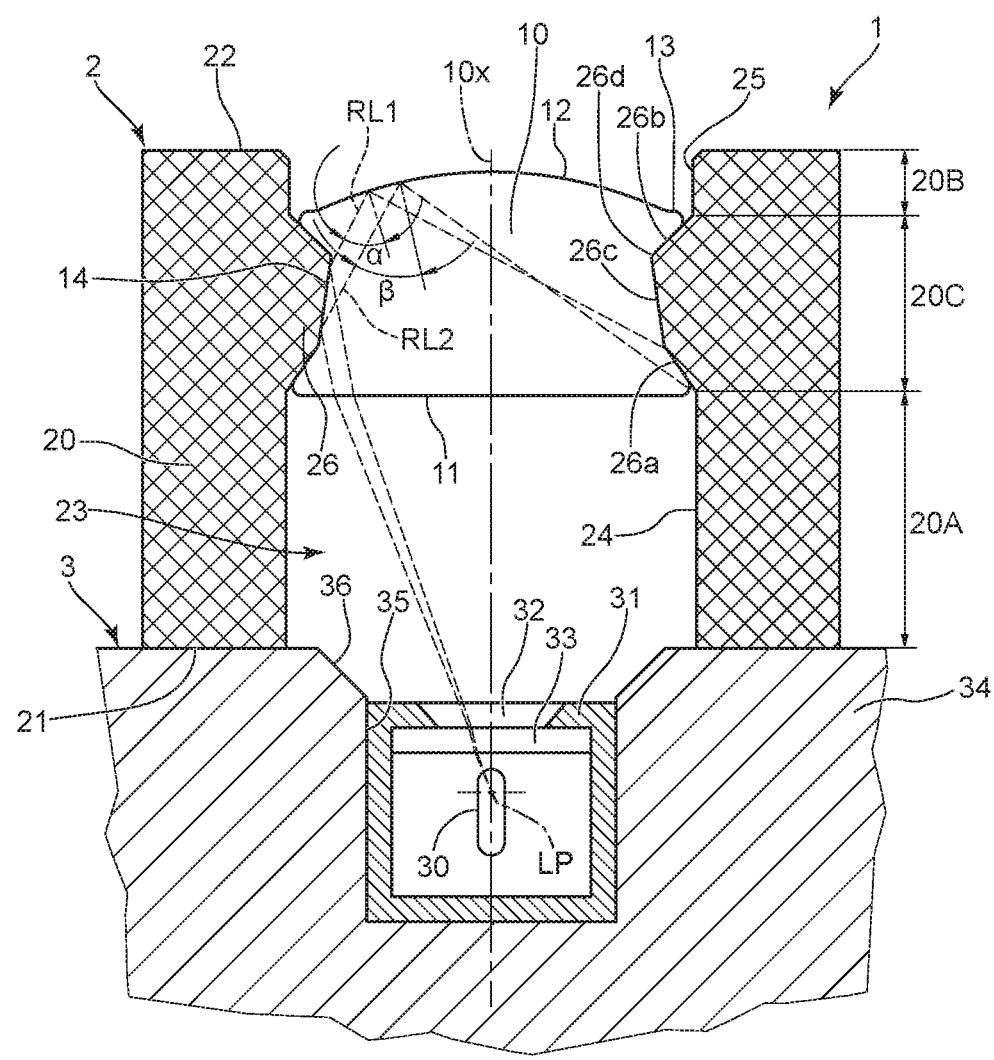
FIG. 7 is a cross-sectional view of the lens unit according to the first embodiment illustrating light rays that are reflected by a projection on the lens frame being totally reflected off the exit surface of the lens element.

The lens unit 2 is also provided with a function of preventing reflection light that is reflected from the projection 26 (which holds the lens element 10) and heads toward the exit surface 12 from becoming harmful light. FIG. 7 indicates a reflection light ray RL1 and a reflection light ray RL2 which each enter from (made incident on) the incident surface 11, are each reflected by the third tapered surface 26c of the projection 26 and travel toward the exit surface 12. The third tapered surface 26c is formed to satisfy conditions so that each of the reflection light rays RL1 and RL2 totally reflect at the exit surface 12 (i.e., so total internal reflection (TIR) of the reflection light rays RL1 and RL2 respectively occurs at the exit surface 12).

Specifically, the angle of the third tapered surface 26c is determined so that incident angle α of the reflection light ray RL1 relative to the exit surface 12 and the incident angle β of the reflection light ray RL2 relative to the exit surface 12 are each greater than the critical angle for total internal reflection. Accordingly, at the exit surface 12, which defines a boundary between the lens element 10 (a medium having a relatively large refractive index) and air (a medium having a relatively small refractive index), the refractive angles of the reflection light ray RL1 and the reflection light ray RL2 each become greater than 90 degrees, so that total internal reflection of each of these light rays occurs. Note that although FIG. 7 shows specific reflection light rays RL1 and RL2, all light rays that originate from the light-emission point LP and reach the third tapered surface 26c via only refraction at the incident surface 11 satisfy the total internal reflection conditions at the boundary between the exit surface 12 and air.

In the projection 26, the first tapered surface 26a that is positioned on the incident side relative to the third tapered surface 26c is inclined relative to the optical axis 10x by a larger angle than that of the third tapered surface 26c, and light rays that are reflected from the first tapered surface 26a do not travel toward the exit surface 12. Whereas, the second tapered surface 26b, which is positioned on the exit side of the third tapered surface 26c, is a surface that has a progressively greater inner diameter in a direction toward the exit side (a surface that is inclined in a direction opposite to that of the third tapered surface 26c), and all light rays (originating from the light source 30) that pass through the incident surface 11 and travel toward the projection 26 are either shielded or reflected by the first tapered surface 26a or the third tapered surface 26c and do not directly reach (arrive at) the second tapered surface 26b. Accordingly, if the profile (shape and angle) of the third tapered surface 26c is determined so that the above-mentioned total internal reflection conditions are satisfied, an advantageous effect of being able to prevent harmful light by the entire projection 26, which is in contact with the outer peripheral recess 14 of the lens element 10, can be achieved.

Hence, in the lens unit 2, effective light rays EL can be reliably transmitted therethrough while harmful light such as light other than the effective light rays EL (peripheral light rays OL, reflection light rays RL1 and RL2, etc.) can be prevented from passing through the exit surface 12 and exiting therefrom. In particular, harmful light rays can be effectively shielded by the projection 26, which projects in an inward radial direction of the lens frame 20. Furthermore, by determining the inclination angle of the third tapered surface 26c so that light rays that are reflected by the third tapered surface 26c and are totally internally reflected at the exit surface 12 so that these light rays do not exit from the exit surface 12, a deterioration in optical performance due to reflection of light rays at an outer peripheral portion of the lens element 10 (at a position where the outer peripheral recess 14 and the projection 26 come in contact) can be appropriately prevented. Accordingly, light can be prevented from diffusing, which causes ghosting to occur, outside an optically designed predetermined range at the light-converging position of the lens element 10, and an improved optical performance of the optical device 1 can be achieved.

Since the projection 26 possesses the above-described light-shielding function in addition to projecting radially inward in the lens frame 20 to hold the lens element 10, there is no need to provide a separate structure dedicated to light shielding, so that the lens unit 2 can have an increased functionally while still having a simple structure.

Furthermore, the projection 26 which is formed by a combination of the tapered surfaces 26a, 26b and 26c can be easily manufactured. More specifically, the first tapered surface 26a and the third tapered surface 26c each have a profile that is easy to mold or machine (cut) from the incident side of the lens frame 20, and the second tapered surface 26b has a profile that is easy to mold or machine (cut) from the exit side of the lens frame 20.

Comparative examples which differ from the above-described first embodiment will be hereinbelow described with reference to FIGS. 8 through 12. In each comparative example, any components that are same in structure with the first embodiment will have the same reference numerals and duplicate descriptions thereof are omitted.

Figure 8:
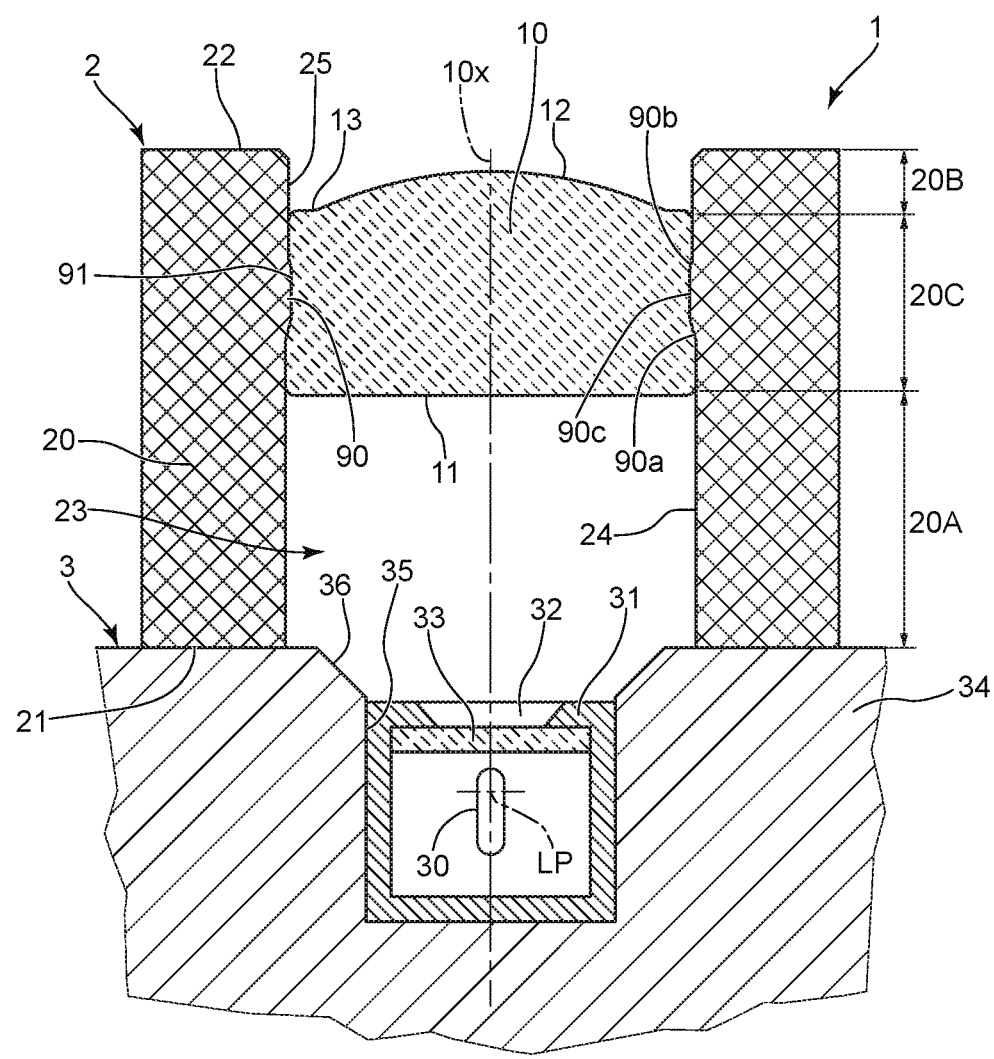
FIG. 8 is a cross-sectional view of main components of an optical device that is provided with a lens unit according to a first comparative embodiment.
Figure 9:
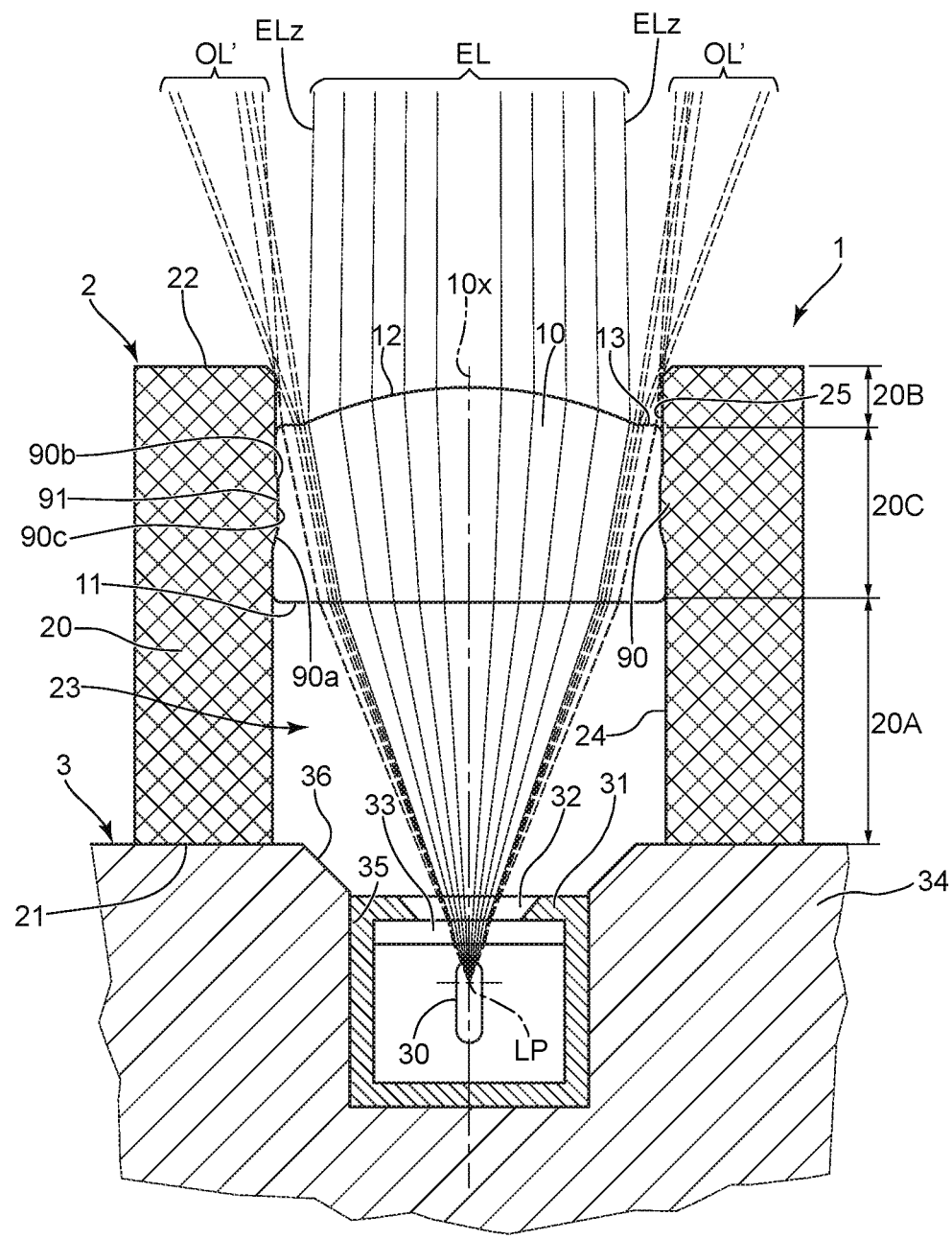
FIG. 9 is a cross-sectional view illustrating a state in which light rays pass through the lens unit according to the first comparative embodiment.
Figure 10:
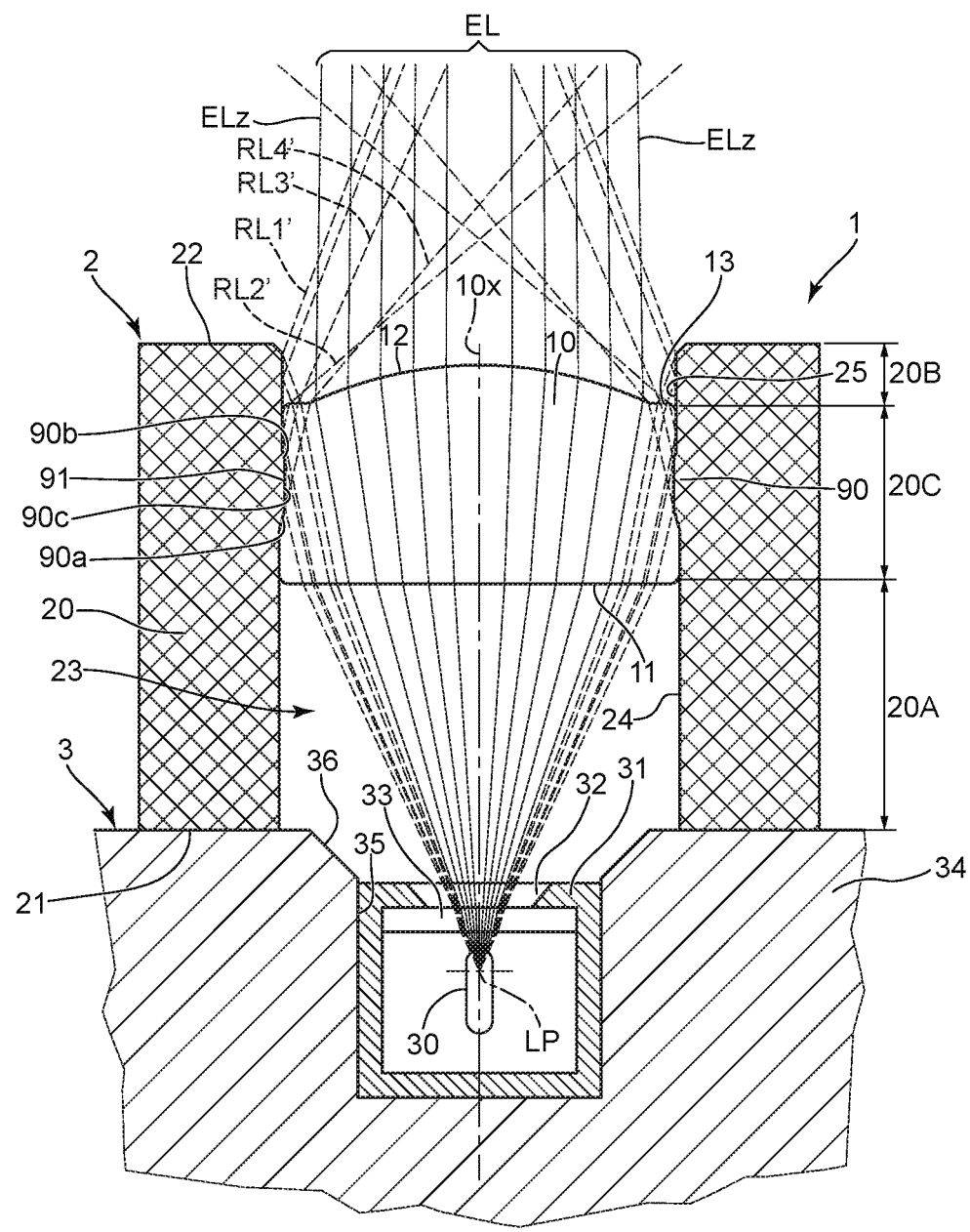
FIG. 10 is a cross-sectional view illustrating a state in which light rays are reflected from an inner surface of a lens frame of the lens unit according to the first comparative embodiment.

In a first comparative example shown in FIGS. 8 through 10, in the lens frame 20 that constitutes a major part of the lens unit 2, an inner surface profile of an intermediate section 20C differs from that of the projection 26 of the first embodiment. The inner surface of the intermediate section 20C in the first comparative example is provided with a projection 90, which slightly projects in the inner radial direction relative to the cylindrical surface 24 of the incident-side section 20A and relative to the cylindrical surface 25 of the exit-side section 20B. The projection amount of the projection 90 in the inner radial direction is much smaller than the projection amount of the above-described projection 26 of the first embodiment. An outer peripheral recess 91 having a shape that the projection 90 fits into is formed on the outer periphery of the lens element 10.

More specifically, the projection 90 is provided with a first tapered surface 90a positioned on the incident side, a second tapered surface 90b positioned on the exit side, and a connection surface 90c that is connected between the first tapered surface 90a and the second tapered surface 90b. The first tapered surface 90a is a partial conical surface having a progressively reduced diameter from the incident side toward the exit side. The second tapered surface 90b is a partial conical surface having a progressively reduced diameter from the exit side toward the incident side. The first tapered surface 90a and the second tapered surface 90b each have a smaller projection amount in the inner radial direction than that of each of the first tapered surface 26a and the second tapered surface 26b of the first embodiment. The connection surface 90c is a cylindrical surface having a constant diameter extending along the optical axis direction. The part of the projection 90 that is positioned at the innermost radial position is the connection surface 90c. However, the connection surface 90c is located at an outer radial position compared to the radial position of the third tapered surface 26c of the projection 26 of the first embodiment.

As shown in FIG. 9, the projection 90 only has a small projection amount in the inner radial direction, and moreover, the connection surface 90c is not inclined relative to the optical axis 10x. Accordingly, the projection 90 does not shield peripheral light rays OL' that pass along an outer radial side of the effective light rays EL, so that the peripheral light rays OL' end up reaching the boundary position between the exit surface 12 and the exit peripheral rim surface 13 of the lens element 10 and/or the position of the exit peripheral rim surface 13. Furthermore, as shown in FIG. 10, a reflection light ray RL1' passing through the exit peripheral rim surface 13 and reflecting off the cylindrical surface 25 of the lens frame 20 may occur, a reflection light ray RL2' that reflects off the cylindrical surface 25 and passes through the exit peripheral rim surface 13 may occur, and reflection light rays RL3' and RL4' that reflect off the projection 90 and exit from the lens element 10 (the exit peripheral rim surface 13 or the exit surface 12) may occur. Such peripheral light and reflection light become the cause of ghosting.

Furthermore, since the connection surface 90c of the projection 90 is a surface that is parallel to the optical axis 10x, the connection surface 90c cannot receive a load in the optical axis direction, and the connection surface 90c cannot be used as a reference position with respect to the optical axis direction.

Figure 11:
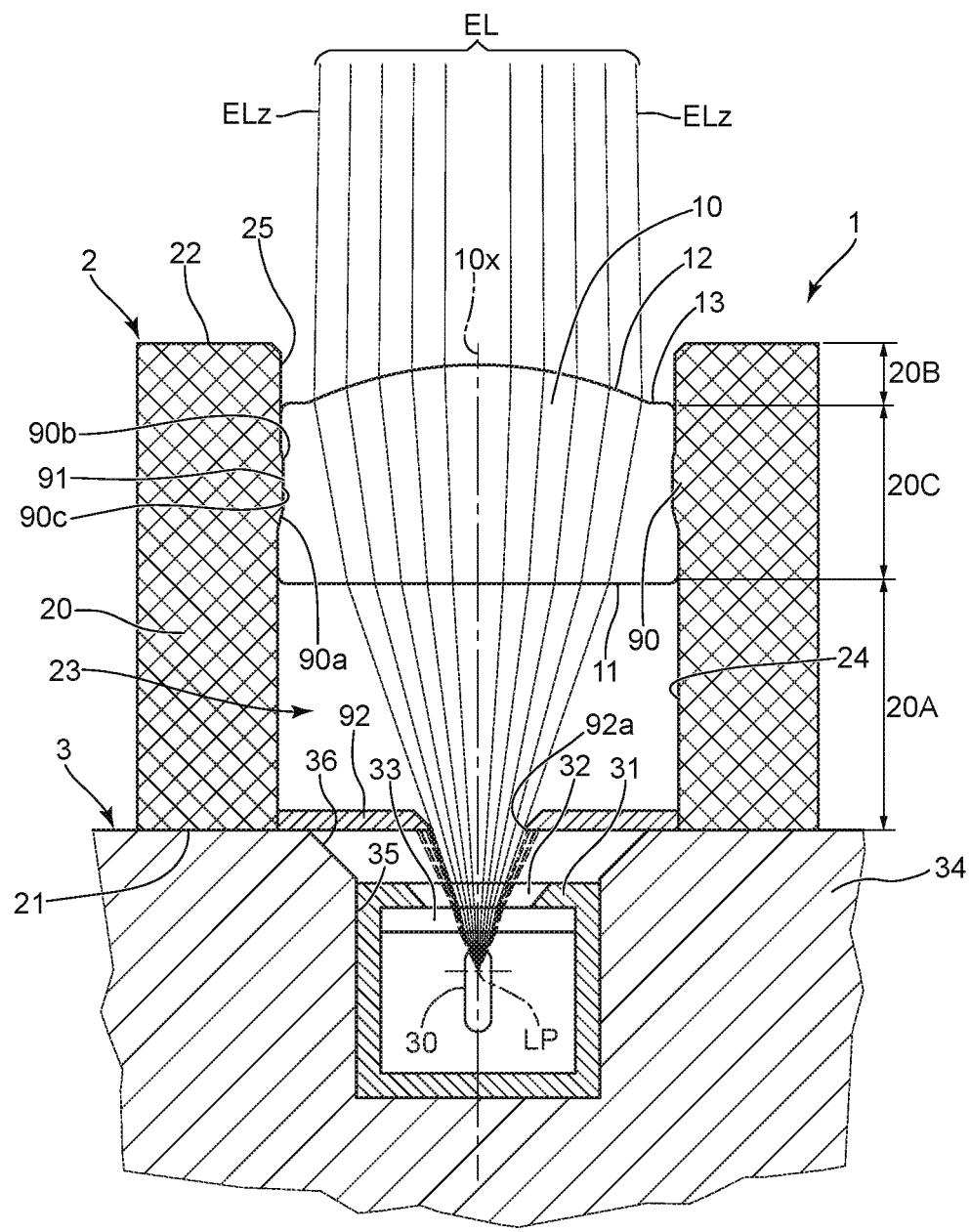
FIG. 11 is a cross-sectional view of main components of an optical device that is provided with a lens unit according to a second comparative embodiment.

In a second comparative example shown in FIG. 11, in addition to the structure of the first comparative example, a diaphragm 92 is provided between the light source 30 and the lens element 10. The diaphragm 92 is provided to cover the light-source peripheral-edge surface 36 of the outer body 34 in the light source unit 3. The diaphragm 92 has a round through-hole 92a formed therethrough at a central portion of the diaphragm 92. The through-hole 92a is set to a size that only allows the effective light rays EL to pass through.

Light that travels outside (outer radial side of) the effective light rays EL are shielded (shut out) by a plate surface of the diaphragm 92 around the peripheral area of the through-hole 92a. Therefore, harmful peripheral light does not reach the lens element 10, ghosting can be prevented even though the projection amount of the projection 90 provided on the inner side of the intermediate section 20C is small.

However, since the second comparative example uses the diaphragm 92, which is a light-shielding member that is independent from the lens frame 20, this incurs an increase in the number of components and an increase in manufacturing cost. Furthermore, since the diaphragm 92 is a separate member from the lens frame 20, it is necessary to carry out an adjustment of the positional setting of the diaphragm 92 relative to the lens unit 2 and the light source unit 3 so that only harmful light rays are shielded and not the effective light rays EL, thereby causing the precision management and manufacture to become complicated.

Figure 12:
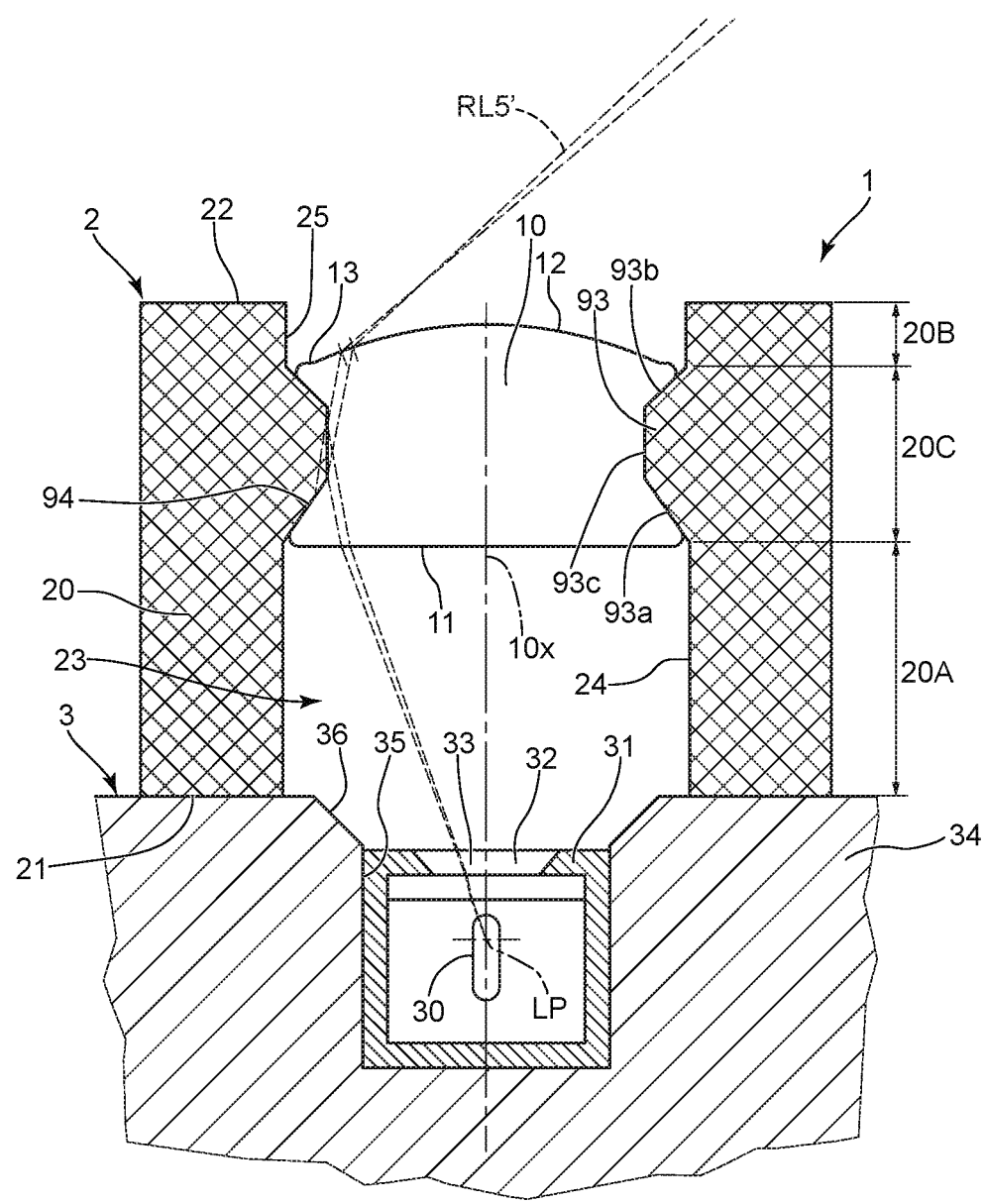
FIG. 12 is a cross-sectional view of main components of an optical device that is provided with a lens unit according to a third comparative embodiment.

In a third comparative example shown in FIG. 12, a projection 93, which is formed on an inner surface of the intermediate section 20C of the lens frame 20, has a different shape to that of the projection 26 of the first embodiment. More specifically, the projection 93 is provided with a first tapered surface 93a that connects with the exit end of the cylindrical surface 24, a second tapered surface 93b that connects with the incident end of the cylindrical surface 25, and a connection surface 93c that is connected between the first tapered surface 93a and the second tapered surface 93b. An outer peripheral recess 94, into which the projection 93 fits, is formed on the outer peripheral portion of the lens element 10.

The second tapered surface 93b is a surface having the same profile as that of the second tapered surface 26b of the first embodiment (having the same inclination angle as that of the second tapered surface 26b, and having the same projecting amount in the inner radial direction from the cylindrical surface 25 as that of the second tapered surface 26b). The first tapered surface 93a has the same inclination angle as that of the first tapered surface 26a of the first embodiment, but has a larger projecting amount in the inner radial direction from the cylindrical surface 24 than that of the first tapered surface 26a. The connection surface 93c is a cylindrical surface having a constant diameter extending along the optical axis direction, and is parallel to the optical axis 10x. The part of the projection 93 that is positioned at the innermost radial position is the connection surface 93c. The connection surface 93c is located at the same position in the radial direction as the maximum projecting portion 26d of the first embodiment.

In regard to shielding peripheral light rays that pass along an outer radial side of the effective light rays EL, the projection 93 can achieve the same effect as that achieved by the projection 26 of the first embodiment. Whereas, as shown in FIG. 12, since reflection light ray RL5' which reflects off connection surface 93c reaches the exit surface 12 at an incident angle that is less than the critical angle for total internal reflection, there is a possibility of ghosting occurring due to part of the light reflected from the connection surface 93c passing through the exit surface 12 (without totally internally reflecting).

Furthermore, since the connection surface 93c of the projection 93 is a parallel surface relative to the optical axis 10x, a load in the optical axis direction cannot be received by the connection surface 93c, nor can the connection surface 93c be used as a positional reference in the optical axis direction.

Unlike the above-described comparative examples, since in the above-described first embodiment, light-distribution defects (ghosting, etc.), caused by light other than effective light rays passing through, can be prevented by the projection 26 (provided in the lens frame 20) that holds the lens element 10, superior optical performance can be achieved with a small number of components.

Furthermore, in the above-described first embodiment, by forming the inner surface of the projection 26 with the tapered surfaces 26a, 26b and 26c, which are each inclined relative to the optical axis 10x, advantageous effects can be achieved with respect to joining strength, positional precision, load bearing and air-tightness between the lens element 10 and the lens frame 20, compared to the comparative examples.

Figure 16:
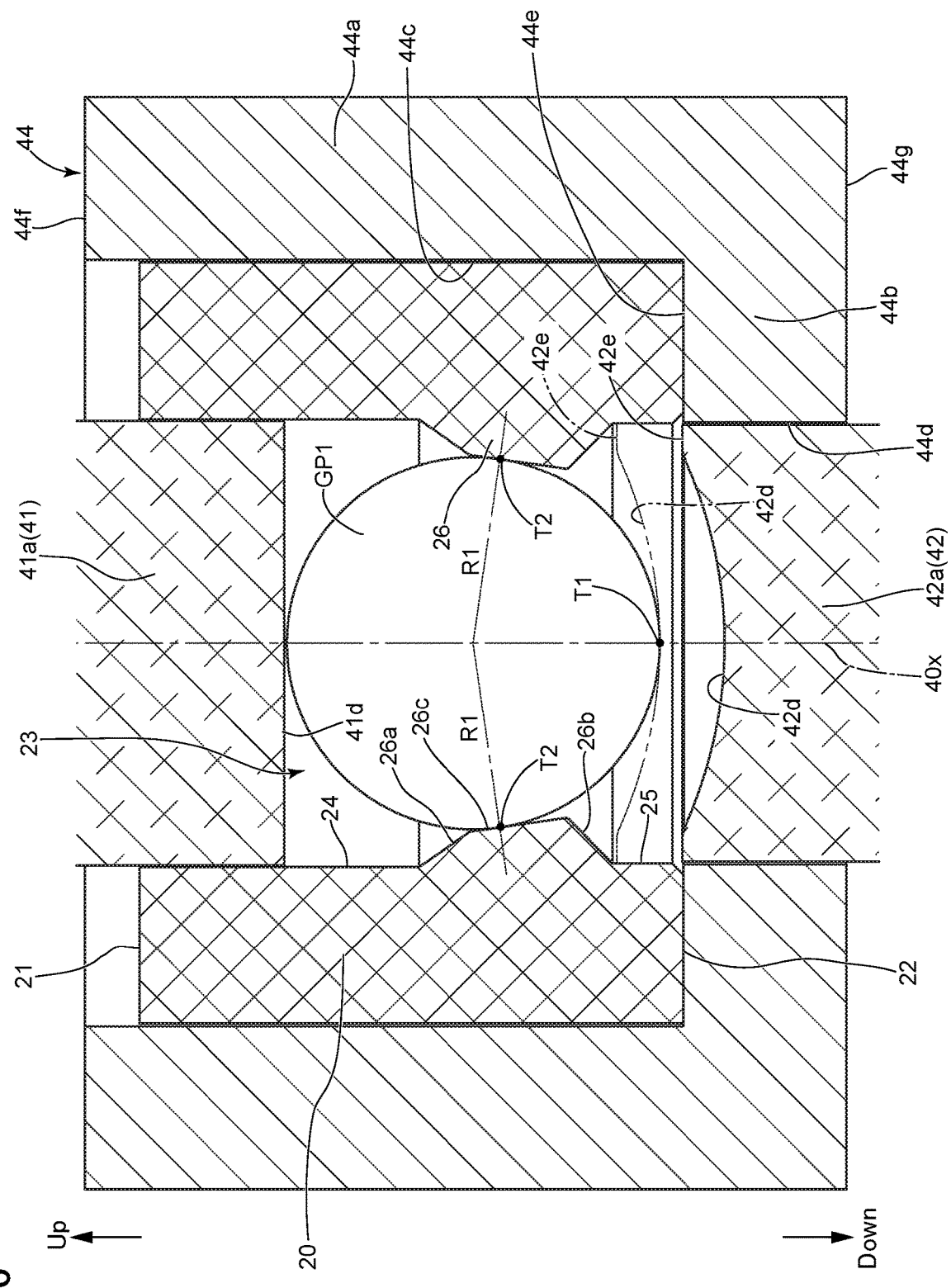
FIG. 16 is an enlarged cross-sectional view of part of FIG. 13.
Figure 17:
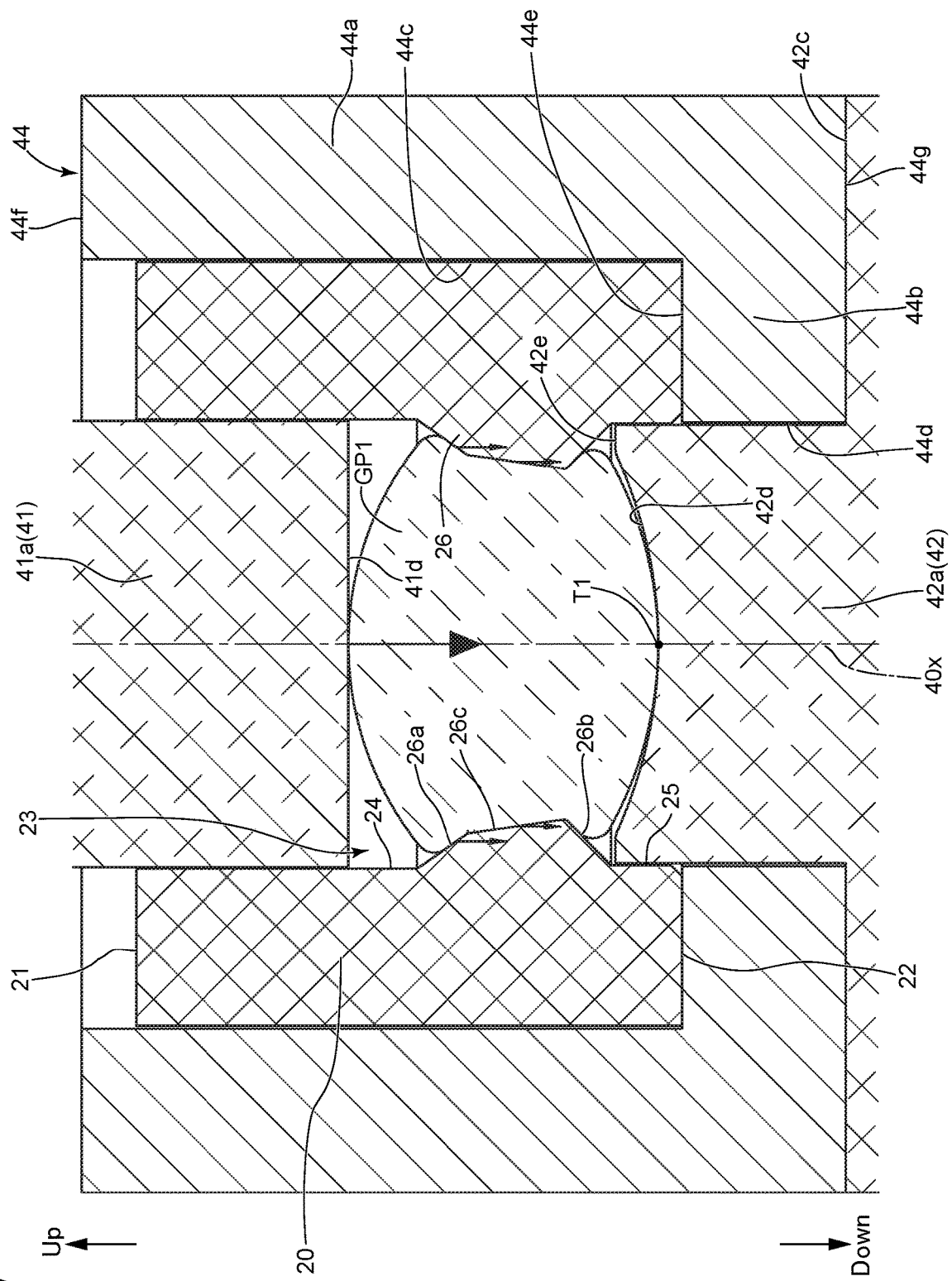
FIG. 17 is an enlarged cross-sectional view of part of FIG. 14.

Hereinafter, a manufacturing method of the lens element 10 in the lens unit 2 of the first embodiment will be discussed. The lens element 10 is manufactured by a press-molding process using a press-molding apparatus 40 shown in FIGS. 13 through 15. FIGS. 16 and 17 are enlarged partial views FIGS. 13 and 14, respectively.

When the lens element 10 is manufactured in the press-molding apparatus 40, a spherical glass preform GP1, which is the material used for the lens element 10, is placed inside the lens frame 20, and the lens element 10 is integrally molded with the lens frame 20. The lens frame 20 is first finished to the final shape including the above-described projection 26 at a stage prior to placing the lens frame 20 into the press-molding apparatus 40.

The press-molding apparatus 40 is provided with an upper die 41, a lower die 42, a barrel die 43, and a barrel die 44. The "up" and "down" directions indicated in FIGS. 13 through 15 correspond to the upward and downward directions of the press-molding apparatus 40. A reference axis 40x of the press-molding apparatus 40 is an imaginary axial line extending in the upward and downward directions (vertical direction). The central axes of the upper die 41, the lower die 42, the barrel die 43, and the barrel die 44 are aligned on the reference axis 40x, respectively. Furthermore, the optical axis 10x of the lens element 10 that is press-molded by the press-molding apparatus 40 is designed to be aligned with the reference axis 40x.

The upper die 41 and the lower die 42 can be separately moved in the upward and downward directions via a raising and lowering mechanism, not shown in the drawings. The upper die 41 is movably-guided in the upward and downward directions by the barrel die 43, and the lower die 42 is movably-guided in the upward and downward directions by the barrel die 44.

The barrel die 44 is provided with a cylindrical portion 44a positioned on the outer radial side of the lens frame 20, and a projection portion 44b projecting radially inwardly from a lower end of the cylindrical portion 44a. A receiving hole 44c having a circular cross-section is formed in an inner peripheral portion of the cylindrical portion 44a, and a guide hole 44d having a circular cross-section is formed in an inner peripheral portion of the projection portion 44b. The inner peripheral surfaces of both the receiving hole 44c and the guide hole 44d are cylindrical surfaces, respectively, having centers about the reference axis 40x. The inner diameter of the receiving hole 44c is greater than the inner diameter of the guide hole 44d. The receiving hole 44c and the guide hole 44d constitute a single through-hole extending the in the upward and downward directions (vertical direction) with the receiving hole 44c open at the upper end of the barrel die 44 and the guide hole 44d open at the lower end of the barrel die 44. An annular upward-movement restriction surface (stopper flange surface) 44e is formed at the lower end of the receiving hole 44c on the upper face (upper surface) of the projection portion 44b. The restriction surface 44e is a flat surface lying orthogonal to the reference axis 40x.

An upper end surface 44f of the barrel die 44 is an upward-facing annular surface formed around the periphery of an upper-end opening of the receiving hole 44c. A lower end surface 44g of the barrel die 44 is a downward-facing annular surface formed around the periphery of a lower-end opening of the guide hole 44d, and part of the lower end surface 44g defines an undersurface of the projection portion 44b. Both of the upper end surface 44f and the lower end surface 44g are flat surfaces lying orthogonal to the reference axis 40x.

The barrel die 43 is a cylinder that surrounds the outer radial side of the cylindrical portion 44a of the barrel die 44. A guide hole 43a having a circular cross-section is formed in an inner peripheral portion of the barrel die 43 and extends through the barrel die 43 in the upward and downward directions (vertical direction). An inner surface of the guide hole 43a is a cylindrical surface centered about the reference axis 40x. It should be noted that the barrel die 43 and the barrel die 44 may be integrally formed (unitarily formed).

The upper die 41 is provided with a shaft portion 41a which extends in the upward and downward directions (vertical direction), and a large-diameter portion 41b positioned on top of the shaft portion 41a. The shaft portion 41a and the large-diameter portion 41b are each cylindrical in shape, centered along the reference axis 40x. The diameter of the large-diameter portion 41b is larger than that of the shaft portion 41a. A restriction surface 41c, which is annular in shape and faces downwards, is formed at a boundary portion between the shaft portion 41a and the large-diameter portion 41b. The restriction surface 41c is a flat surface that is orthogonal to the reference axis 40x. A molding surface 41d is formed on the end (the lower end) of the shaft portion 41a. The molding surface 41d is a flat surface that corresponds to the shape (profile) of the incident surface 11 of the lens element 10.

The lower die 42 is provided with a shaft portion 42a which extends in the upward and downward directions (vertical direction), and a large-diameter portion 42b positioned under the shaft portion 42a. The shaft portion 42a and the large-diameter portion 42b are each cylindrical in shape, centered along the reference axis 40x. The diameter of the large-diameter portion 42b is larger than that of the shaft portion 42a. A restriction surface 42c, which is annular in shape and faces upwards, is formed at a boundary portion between the shaft portion 42a and the large-diameter portion 42b. The restriction surface 42c is a flat surface that is orthogonal to the reference axis 40x. A molding surface 42d is formed on the end (the upper end) of the shaft portion 42a. The molding surface 42d is a concave surface that corresponds to the shape (profile) of the exit surface 12 of the lens element 10. An annular surface 42e that corresponds to the shape (profile) of the exit peripheral rim surface 13 of the lens element 10 is formed at a peripheral portion of the molding surface 42d.

The upper die 41 and the lower die 42 are formed from a material having superior thermal resistivity and durability so that breakage or deterioration thereof do not occur during press operations under high temperatures. Specifically, the upper die 41 and the lower die 42 may be formed from a ceramic material such as silicon carbide (SiC) or silicon nitride ($Si_3N_4$), or formed from a metal such as a cemented carbide. The barrel die 43 and the barrel die 44 are also formed from a material having superior thermal resistivity and durability, in the same manner as for the upper die 41 and the lower die 42.

Figure 13:
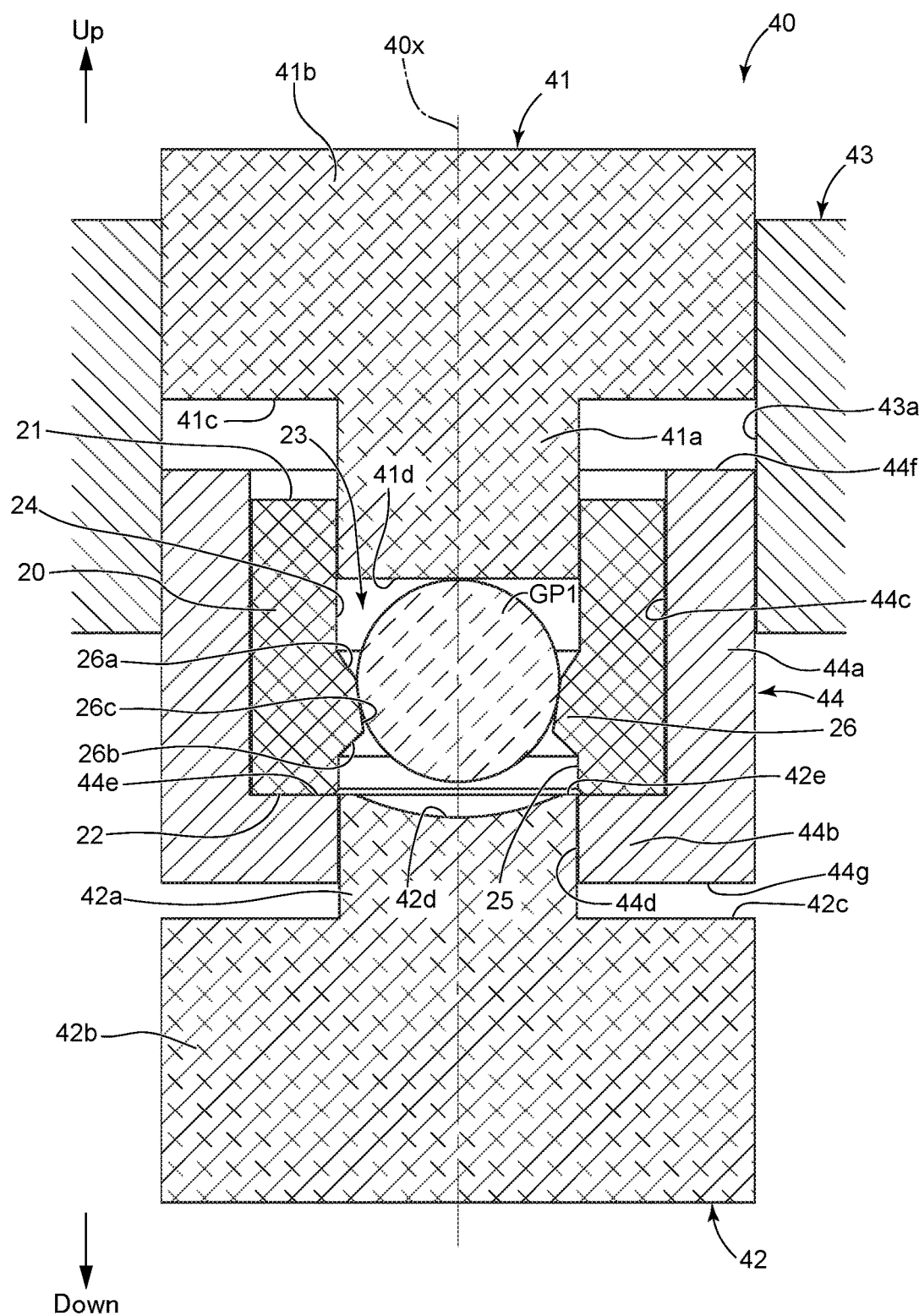
FIG. 13 is a cross-sectional view of a press-molding ready state for a lens element in a molding apparatus for manufacturing the lens unit according to the first embodiment.

As shown in FIGS. 13 and 16, the lens frame 20 is arranged inside the receiving hole 44c of the barrel die 44 with the exit end 22 of the lens frame 20 facing downward. The position of the lens frame 20 in the radial direction is determined by the inner peripheral surface of the cylindrical portion 44a (receiving hole 44c). The position of the lens frame 20 with respect to the upward and downward directions (vertical direction) is determined by the exit end 22 coming into contact with the restriction surface 44e. The length of the lens frame 20 from the incident end 21 to the exit end 22 is shorter than the depth of the receiving hole 44c (the distance from the restriction surface 44e to the upper end surface 44f). Therefore, with the lens frame 20 inserted into the receiving hole 44c, the upward-facing incident end 21 is positioned lower than the upper end surface 44f.

Due to the exit end 22 being arranged to face downward, the projection 26 within the lens frame 20 is positioned so that the second tapered surface 26b, the third tapered surface 26c and the first tapered surface 26a are positioned in that order from a lower position (ordered an upward direction). Furthermore, the first tapered surface 26a and the third tapered surface 26c are each inclined so that the inner diameters thereof are progressively reduced in a downward vertical direction. Whereas, the second tapered surface 26b is a tapered surface in which the inner diameter thereof is progressively larger in a downward vertical direction. In other words, the lens frame 20 is arranged in the press-molding apparatus 40 with an end of the third tapered surface 26c of the projection 26 that has a smaller inner diameter than the other end, with respect to the optical axis direction, is positioned downward.

A spherical shaped glass preform GP1 is inserted, from above, into the through-hole 23 of the lens frame 20, which is arranged inside the press-molding apparatus 40 in the above-described manner. Alternatively, the lens frame 20 with the glass preform GP1 already inserted into the through-hole 23 may be placed into the press-molding apparatus 40. As shown in FIG. 16, the diameter of the glass preform GP1 is smaller than the inner diameters of the cylindrical surface 24 and the cylindrical surface 25 of the lens frame 20 and is larger than the inner diameter of the projection 26. More specifically, the outer surface of the glass preform GP1 is determined to have dimensions so as to come in contact with the third tapered surface 26c at an intermediate position with respect to the vertical direction. The center (spherical center) of the glass preform GP1 when placed on the third tapered surface 26c is positioned on the reference axis 40x.

When the lens frame 20 and the glass preform GP1 are being placed inside the barrel die 44, the upper die 41 is at a retreated position, further upward than the position shown in FIG. 13. Thereafter, upon the lens frame 20 and the glass preform GP1 being placed into position, the upper die 41 is moved downward.

The upper die 41 is inserted into the guide hole 43a of the barrel die 43 (refer to FIG. 13). The outer diameter of the large-diameter portion 41b corresponds to the inner diameter of the guide hole 43a, and the outer peripheral surface of the large-diameter portion 41b slides along the inner peripheral surface of the guide hole 43a to thereby guide the upward and downward movement of the upper die 41. An extremely small clearance in the radial direction is defined between the large-diameter portion 41b and the guide hole 43a. The position of the upper die 41 in the radial direction and the angle (the parallelism with the reference axis 40x) are precisely determined by the barrel die 43.

Upon the upper die 41 being moved downward by a certain amount, the shaft portion 41a enters into the through-hole 23 of the lens frame 20 from above (refer to FIGS. 13 and 16). The shaft portion 41a enters into the through-hole 23 from the opening at the incident end (21) side. The outer diameter of the shaft portion 41a corresponds to the inner diameter of the cylindrical surface 24 of the through-hole 23; however, a clearance in the radial direction between the shaft portion 41a and the cylindrical surface 24 is slightly larger than the clearance between in the radial direction between the large-diameter portion 41b and the guide hole 43a. Accordingly, the upper die 41 can be moved upwardly and downwardly in the vertical direction while being guided with high precision by the guide hole 43a of the barrel die 43 without being impeded by the lens frame 20 (the incident-side section 20A).

The lower die 42 is inserted into the guide hole 44d of the barrel die 44 from below (refer to FIGS. 13 and 16). The outer diameter of the shaft portion 42a corresponds to the inner diameter of the guide hole 44d, and the outer peripheral surface of the shaft portion 42a slides along the inner peripheral surface of the guide hole 44d to thereby guide the upward and downward movement of the lower die 42. An extremely small clearance in the radial direction is defined between the shaft portion 42a and the guide hole 44d. The position of the lower die 42 in the radial direction and the angle (the parallelism with the reference axis 40x) are precisely determined by the barrel die 44.

FIGS. 13 and 16 show a press-molding ready state, in which the placement of the lens frame 20 and the glass preform GP1 into the press-molding apparatus 40 is completed, and the upper die 41 and the lower die 42 are inserted into the barrel die 43 and the barrel die 44 to predetermined positions, respectively. In this state, the upper die 41 and the lower die 42 are positioned on the same vertical axis (reference axis 40x), with the glass preform GP1 in between and facing the molding surface 41d and the molding surface 42d in the upward and downward directions, respectively.

A heater (not shown) is used to heat inside the press-molding apparatus 40, and is heated up to a temperature that is higher than the glass transition temperature of the glass preform GP1. Accordingly, the glass preform GP1 softens so that it is able to be press-molded.

Figure 14:
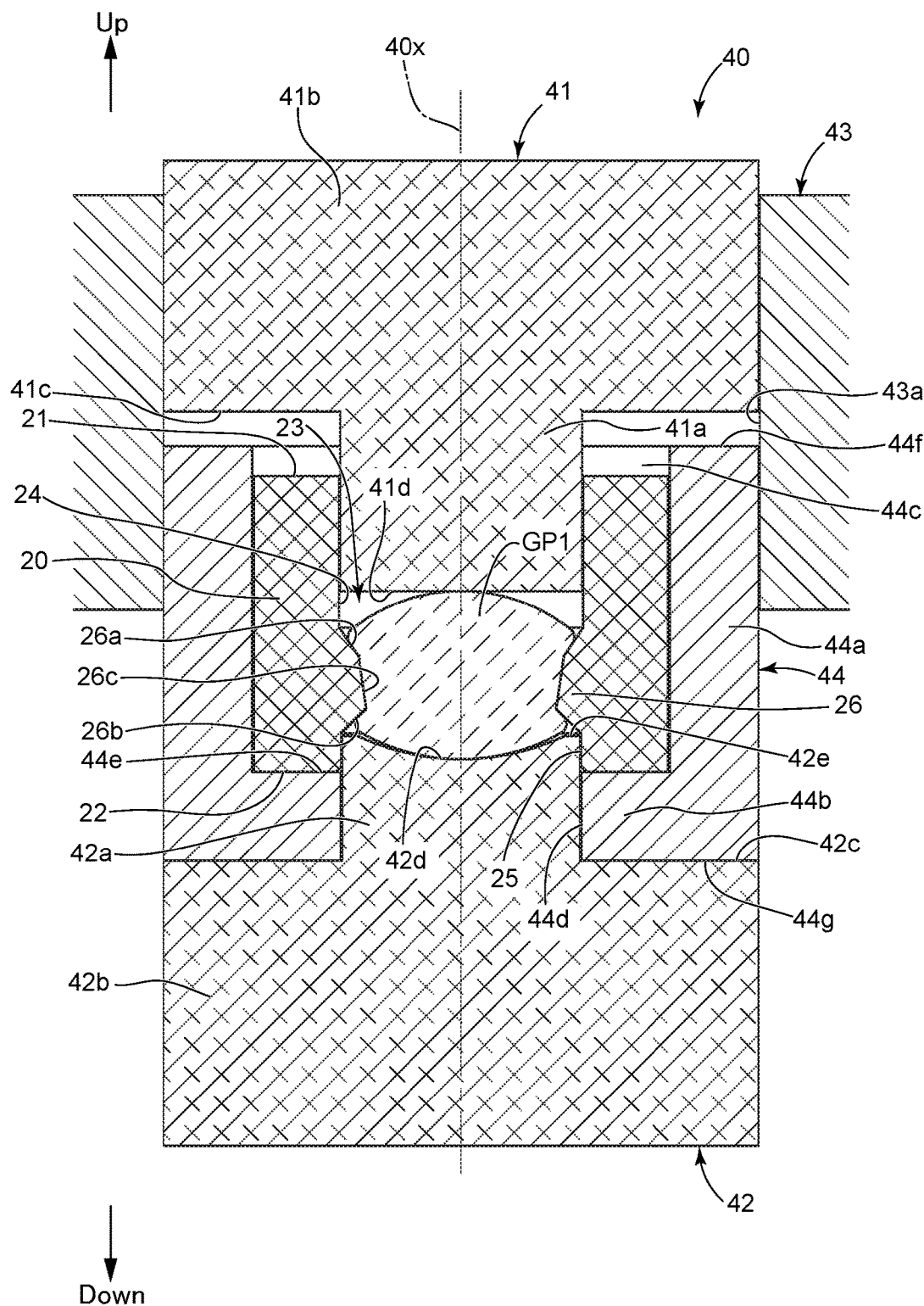
FIG. 14 is a cross-sectional view of partway through a press-molding operation on a lens element in the molding apparatus for manufacturing the lens unit according to the first embodiment.

With the glass preform GP1 in a softened state upon being heated, the upper die 41 and the lower die 42 are moved to a close proximity of the glass preform GP1. As shown in FIGS. 14 and 17, the lower die 42 can be inserted into the barrel die 44 to a position where the restriction surface 42c abuts against the lower end surface 44g, upon which further upward movement of the lower die 42 from such a position is restricted (prevented). In this state, the shaft portion 42a of the lower die 42 enters into the through-hole 23 of the lens frame 20 from below (from the opening on the exit end (22) side). The outer diameter of the shaft portion 42a corresponds to the inner diameter of the cylindrical surface 25 of the through-hole 23; however, the clearance in the radial direction between the shaft portion 42a and the cylindrical surface 25 is slightly larger than the clearance in the radial direction between the shaft portion 42a and the guide hole 44d of the barrel die 44. Accordingly, the lower die 42 can be moved upwardly and downwardly in the vertical direction while being guided with high precision by the guide hole 44d of the barrel die 44 without being impeded by the lens frame 20 (the exit-side section 20B).

It should be noted that when the press-molding apparatus 40 is heated, the mutual dimensions slightly change due to differences between heat expansion rates of the material of the lens frame 20 and the material of the upper and lower dies 41 and 42. However, such changes in dimensions can be absorbed by the above-described clearances between the cylindrical surfaces 24, 25 and the shaft portions 41a, 42a, so that the upper die 41 and the lower die 42 remain movable relative to the lens frame 20.

Upon the lower die 42 being inserted until the restriction surface 42c comes in contact against the lower end surface 44g of the barrel die 44, the molding surface 42d comes in contact with the lower portion of the glass preform GP1. The position of the molding surface 42d at such a stage is shown with a phantom line (two-dot chain line) in FIG. 16. Since the curvature of the outer surface of the glass preform GP1 (in the state of the spherical shape shown in FIGS. 13 and 16) is greater than the curvature of the molding surface 42d, which is a concave surface, the glass preform GP1 comes into point-contact with the molding surface 42d on the reference axis 40x.

Furthermore, the molding surface 41d of the upper die 41 pressed onto an upper portion of the glass preform GP1 as the upper die 41 is lowered. The flat molding surface 41d comes into point-contact with the glass preform GP1 on the reference axis 40x. Thereafter, when the glass preform GP1, with a lower portion thereof in contact with the lower die 42, is pressed downward by the upper die 41, the glass preform GP1 is compressed in the upward and downward directions (refer to FIGS. 14 and 17).

Since the upper die 41 is not completely pressed downward in the state shown in FIGS. 14 and 17, there is a partial gap between a lower portion of the glass preform GP1 and the molding surface 42d, so that the final shapes of the exit surface 12 and the exit peripheral rim surface 13 are not yet formed.

Figure 15:
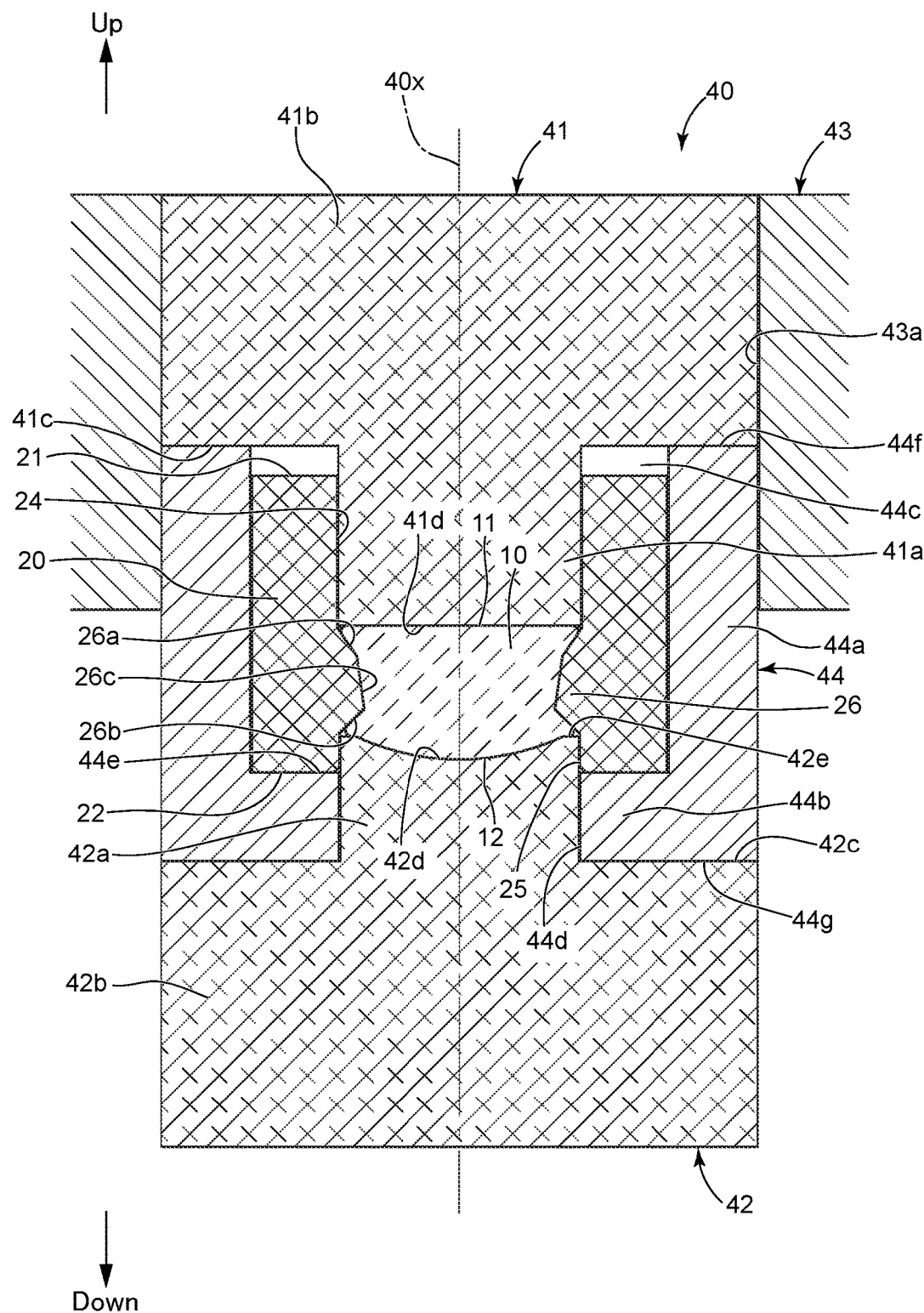
FIG. 15 is a cross-sectional view of a press-molding completion state of a lens element in the molding apparatus for manufacturing the lens unit according to the first embodiment.

Upon moving the upper die 41 further downward from the position shown in FIGS. 14 and 17, the restriction surface 41c abuts against the upper end surface 44f of the barrel die 44 as shown in FIG. 15; the upper die 41 is restricted (prevented) from moving further downward from this abutment position. Hence, the upper die 41 is at a press-molded completion state with the upper die 41 fully pressed down to a press-molding completion state. At this stage, the shapes of the molding surface 41d, the molding surface 42d, and the annular surface 42e are all respectively transferred onto the glass preform GP1 in the lens frame 20, to thereby form the lens element 10 provided with the incident surface 11, the exit surface 12 and the exit peripheral rim surface 13. Furthermore, the outer peripheral recess 14 is formed on the outer peripheral portion of the lens element 10 by the projection 26 of the lens frame 20.

By cooling the lens element 10 from the press-molding completion state to harden the lens element 10, a completed lens unit 2 with the lens element 10 and lens frame 20 integrated with each other is obtained. Thereupon, the upper die 41 and the lower die 42 are vertically moved away from each other in the upward and downward directions, the shaft portion 41a is drawn upward and out of the through-hole 23, and the shaft portion 42a is drawn downward. Thereupon, a completed lens unit 2 is removed out of the receiving hole 44c of the barrel die 44.

In the above-described manufacturing method of the lens unit 2, since the third tapered surface 26c of the lens frame 20, placed inside the press-molding apparatus 40, has a shape (profile) in which the inner diameter thereof progressively reduces in the downward direction, the glass preform GP1 before the press-molding operation is restricted (prevented) from moving further downward from the position at which the third tapered surface 26c comes in contact and supports the glass preform GP1 (the position shown in FIGS. 13 and 16). Accordingly, even if the lower die 42, etc., does not support the glass preform GP1 from underneath, the glass preform GP1 does not drop down, and it is easy to place the glass preform GP1 inside the press-molding apparatus 40.

Furthermore, as shown in FIGS. 13 and 16, the inclination of the third tapered surface 26c of the lens frame 20 produces a downward pressing force on the lens frame 20 by a load acting downward on the glass preform GP1 that is placed on the third tapered surface 26c. Specifically, the load acting downward is the downward pressing load of the upper die 41 on the glass preform GP1, and the weight of the glass preform GP1 and the upper die 41. Due to such a downward load, the lens frame 20 that is placed inside the barrel die 44 can be prevented from rising upward during a press-molding operation. If a press-molding operation were to be performed on the lens element 10 with the lens frame 20 rising upward, the positional relationship between the lens element 10 and the lens frame 20 in the optical axis direction would deviate from the designed positions, so the positional relationship between the light source 30 and the lens element 10 upon constructing the optical device 1 would be unsuitable.

When forming the lens element 10, it is necessary to place the glass preform GP1 at an appropriate position by which both the upper die 41 and the lower die 42 can correctly perform their role in the press-molding operation. For example, if a structure/configuration (unlike that of the illustrated embodiment) were to be used in which the lens frame 20 supports the glass preform GP1 at a higher (upward) position than the position shown in FIGS. 13 and 16, when the lower die 42 is moved to the maximum upward restriction position (the position shown in FIGS. 14, 15 and 17), the molding surface 42d would not be able to contact (or properly contact) the underside of the glass preform GP1. Therefore, in order to avoid such a scenario, the support position (holding position) of the glass preform GP1 by the third tapered surface 26c is determined so that when the lower die 42 is moved up to the maximum upward restriction position, the lower portion of the glass preform GP1 comes in contact with the molding surface 42d.

More specifically, as shown in FIG. 16, a central position T1 for the molding surface 42d is defined on the reference axis 40x at the maximum upward restriction position of the lower die 42. A radius R1 (FIG. 16) is set to a predetermined value in accordance with a condition regarding volume, which will be discussed herein further below.

Furthermore, in the case where the glass preform GP1 of radius R1 is supported at the central position T1 of molding surface 42d, the positional relationship between the third tapered surface 26c, the lower die 42 and the glass preform GP1 is determined so that the third tapered surface 26c contacts the glass preform GP1 at contact positions T2 (FIG. 16), which are positioned further upward than the central position T1. In the illustrated embodiment, the contact positions T2 are determined so that straight lines (each indicated as radius R1 in FIG. 16) from each of the contact positions T2 extending toward the center of the glass preform GP1 are respectively inclined slightly upward relative to a horizontal direction. Furthermore, the third tapered surface 26c passes through the contact positions T2 and is formed to satisfy the aforementioned conditions for total internal reflection (refer to FIG. 7) at the exit surface 12.

In the lens unit 2, the outer and inner lens surfaces of the lens element 10 (the incident surface 11 and the exit surface 12) are not only formed by the press-molding operation using the press-molding apparatus 40, but also the outer peripheral recess 14 of the lens element 10 that receives support from the lens frame 20 (projection 26). In other words, it is difficult to manufacture the lens element 10 by using an extra amount of glass material and remove excess glass material that has bulged outward in a radial direction, etc., upon press-molding a lens surface. Hence, it is necessary to precisely determine the volume of the glass preform GP1 so as to correspond to the volume of the press-molded lens element 10. By forming the glass preform GP1 as a sphere, the volume of the glass preform GP1 can be more easily managed. In particular, since it becomes more difficult to manage error in the amount of glass material to be used as the designed size of the lens element 10 becomes smaller, the effectiveness of using a spherical shaped glass preform GP1 becomes even more prominent.

In the press-molding completion state in which the upper die 41 and the lower die 42 are brought to the closest positions with respect to each other in the upward and downward directions (as shown in FIG. 15), the volume (capacity) of the space defined by the molding surface 41d of the upper die 41, the molding surface 42d and the annular surface 42e of the lower die 42, and the projection 26 of the lens frame 20 determines the volume of the lens element 10 upon being press-molded. The glass preform GP1 is formed by glass material having an amount that fills (corresponds to) the capacity of the above-mentioned space.

Although the spherical shaped glass preform GP1 is superior for managing the volume of the glass material, since the glass preform GP1 can easily roll or rotate, it is necessary to make sure that the glass preform GP1 is stably supported during the press-molding process. For example, if a surface (hereinafter, a "surface from below") that comes in contact with the glass preform GP1 from the underside were to be a convex surface, the spherical shaped glass preform GP1 could not be stably supported. Furthermore, even if the above-mentioned surface from below were to be a flat surface, since the spherical shaped glass preform GP1 may possibly roll in accordance with a load from above, it would be difficult to stably support the glass preform GP1.

Accordingly, it is desirable for the above-mentioned "surface from below" to have a progressively reduced inner diameter in the downward direction (e.g., a concave surface, etc.) for the purpose of increasing stability and positional precision of the glass preform GP1, and it is desirable for the inclination of the "surface from below" to be large (a large curvature in the case of a concave surface) with respect to the reference axis 40x.

As shown in FIG. 16, the third tapered surface 26c which contacts the glass preform GP1 in the lens frame 20 satisfies the above-mentioned conditions for the "surface from below". In particular, since the third tapered surface 26c has a conical shape having a central axis along the reference axis 40x, the position of the glass preform GP1 can be determined both in the optical axis direction and the radial direction by its own weight at a stage before the press-molding operation, so that the glass preform GP1 can be stably supported with high precision. Furthermore, when a pressing load is applied from the upper die 41 onto the glass preform GP1, due to the lens frame 20 being downwardly pushed via the third tapered surface 26c, the lens frame 20 can be prevented from rising upward and a high-precision press-molding operation can be achieved.

Furthermore, the molding surface 42d of the lower die 42 which is positioned below the glass preform GP1 is a concave surface corresponding to the convex shaped exit surface 12 of the lens element 10, and satisfies the above-mentioned conditions for the "surface from below". Whereas, the molding surface 41d of the upper die 41 that is positioned above the glass preform GP1 is a flat surface corresponding to the flat incident surface 11 of the lens element 10. When the upper die 41 and the lower die 42 are brought towards each other to press-mold the lens element 10 from the glass preform GP1, by positioning the concave molding surface 42d at the bottom instead of the flat molding surface 41d, a stabilizing action against the glass preform GP1 in the optical axis direction and the radial direction can be obtained in accordance with the load in the downward direction.

In other words, out of the incident surface 11 and the exit surface 12 of the positive powered lens element 10, by forming (setting) the molding surface (the molding surface 42d in the illustrated embodiment) that molds the convex lens surface (the exit surface 12 in the illustrated embodiment) that has a large curvature (small curvature radius) on the lower die 42 and press-molding the lens element 10 therewith, positional deviation of the glass preform GP1 can be suppressed and the molding precision can be improved.

Furthermore, by arranging the lens frame 20 in the press-molding apparatus 40 so that the smaller end of the inner diameter of the third tapered surface 26c faces downward, and placing the glass preform GP1 onto the third tapered surface 26c, the glass preform GP1 can be stably supported from before the press-molding operation and throughout the entire press-molding operation itself.

Furthermore, the first tapered surface 26a and the third tapered surface 26c of the lens frame 20, which is arranged within the press-molding apparatus 40 so that the smaller inner diameter side thereof faces downward, each have a function of appropriately controlling the deforming of the glass preform GP1 during the press-molding operation.

As shown in FIGS. 16 and 17, from the initial stage of the press-molding operation until the final stage thereof, the position of the glass preform GP1 which directly receives the pressing force from the upper die 41 is a contact position on the reference axis 40x. However, a compression load also occurs on a peripheral portion of the glass preform GP1, far from the reference axis 40x in the radial direction, due to the downward pressing force also being received by the first tapered surface 26a and the third tapered surface 26c. Accordingly, a suitable surface pressure can be obtained during the press-molding operation so that the peripheral edge portion of the lens element 10 including the outer peripheral recess 14 can be formed with high precision. Furthermore, the softened glass preform GP1 can reliably enter around and into the lower portion of the projection 26 by following the first tapered surface 26a and the third tapered surface 26c, which constitute a two-stage inclination, and along the second tapered surface 26b that inclines in the opposite direction thereto. Accordingly, due to the projection 26 of the lens frame 20, a press-molding operation can be efficiently performed while suppressing any inclination or decentration of the glass preform GP1 with respect to the reference axis 40x.

Hence, by using the press-molding apparatus 40, the lens element 10 can be efficiently molded with high precision, and production yield of the lens unit 2 can be improved.

Figure 18:
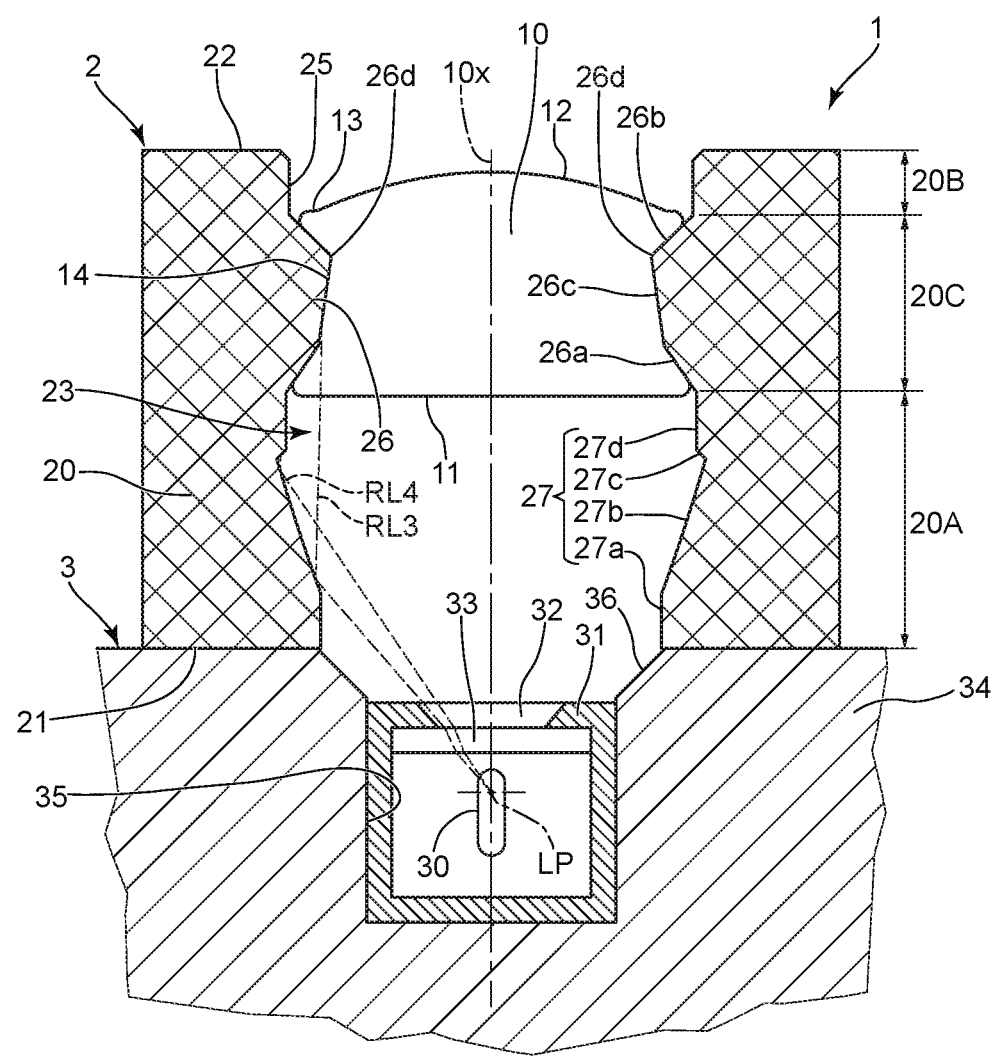
FIG. 18 is a cross-sectional view of main components of an optical device that is provided with a lens unit according to a second embodiment.

A second embodiment of the lens unit 2 is shown in FIG. 18. In the lens unit 2 of the above-described first embodiment, the inner surface of the incident-side section 20A of the lens frame 20 is a smooth cylindrical surface (24) having a uniform profile (constant diameter) along the optical axis direction. Whereas, the lens unit 2 according to the second embodiment differs with respect to further measures taken against reflection light on the inner surface of the incident-side section 20A. The lens unit 2 according to the second embodiment has the same structure as that of the first embodiment except for the inner surface of the incident-side section 20A.

As shown in FIG. 18, the inner surface of the incident-side section 20A of the second embodiment is provided with a composite inner surface (reflection control portion) 27 formed of a plurality of surface portions of differing inner diameters and inclinations. The composite inner surface 27 is provided with a first cylindrical surface 27a, a first tapered surface 27b, a second tapered surface 27c, and a second cylindrical surface 27d, in that order from the incident side.

The second cylindrical surface 27d is a cylindrical surface having substantially the same diameter as that of the cylindrical surface 24 of the first embodiment. The first cylindrical surface 27a is a cylindrical surface having a smaller inner diameter than that of the second cylindrical surface 27d. The first tapered surface 27b has a conical shape (is a partial conical surface) having an inner diameter that is smallest at a boundary with the first cylindrical surface 27a, and the inner diameter is progressively larger toward the second tapered surface 27c (exit side) with respect to the optical axis direction. The second tapered surface 27c has a conical shape (is a partial conical surface) having an inner diameter that is largest at a boundary with the first tapered surface 27b, and the inner diameter is progressively smaller toward the second cylindrical surface 27d (exit side) with respect to the optical axis direction.

Reflection light rays RL3 and RL4 emitted from the light source 30 and reflected off the first tapered surface 27b are shown in FIG. 18. The reflection light ray RL3 is shown as a light ray that is reflected by the first tapered surface 27b at a position near the first cylindrical surface 27a (incident side), and the reflection light ray RL4 is shown as a light ray that is reflected by the first tapered surface 27b at a position near the second tapered surface 27c (exit side). Since the first tapered surface 27b reflects the reflection light ray RL3 so as to travel toward the projection 26, the reflection light ray RL3 is obstructed from traveling toward the exit side by the projection 26. The reflection light ray RL4 is obstructed from traveling toward the exit side by the second tapered surface 27c, which is adjacent to the first tapered surface 27b.

Accordingly, in the lens frame 20 of the second embodiment, since light rays reflected off the inner surface of the incident-side section 20A can be prevented from exiting through the lens element 10, an even more superior optical performance (ghosting prevention effect) can be achieved. It should be noted that suppression of the light rays from the inner surface of the incident-side section 20A is not limited to the structure shown in FIG. 18. For example, it is also possible to use a light-shielding line structure having repetitive fine concavities and convexities with respect to the optical axis direction.

Figure 19:
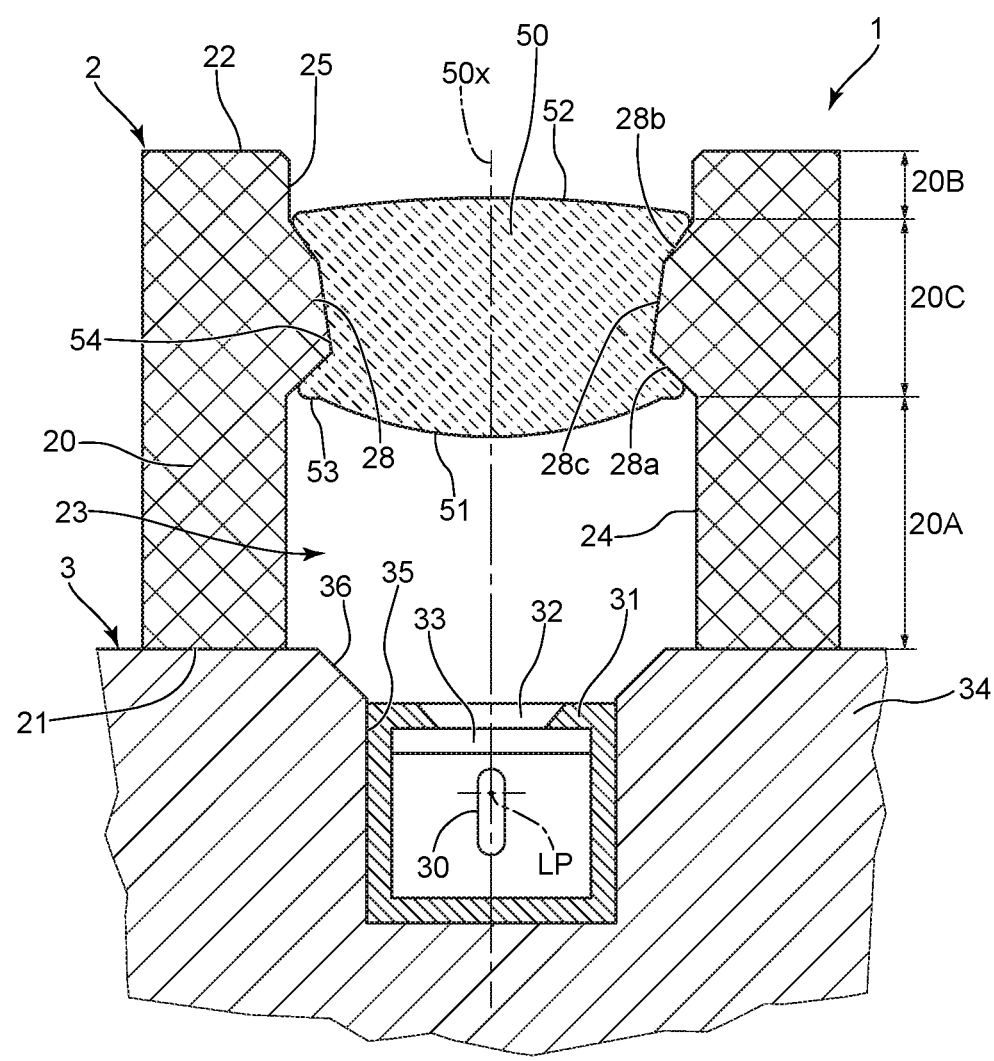
FIG. 19 is a cross-sectional view of main components of an optical device that is provided with a lens unit according to a third embodiment.
Figure 20:
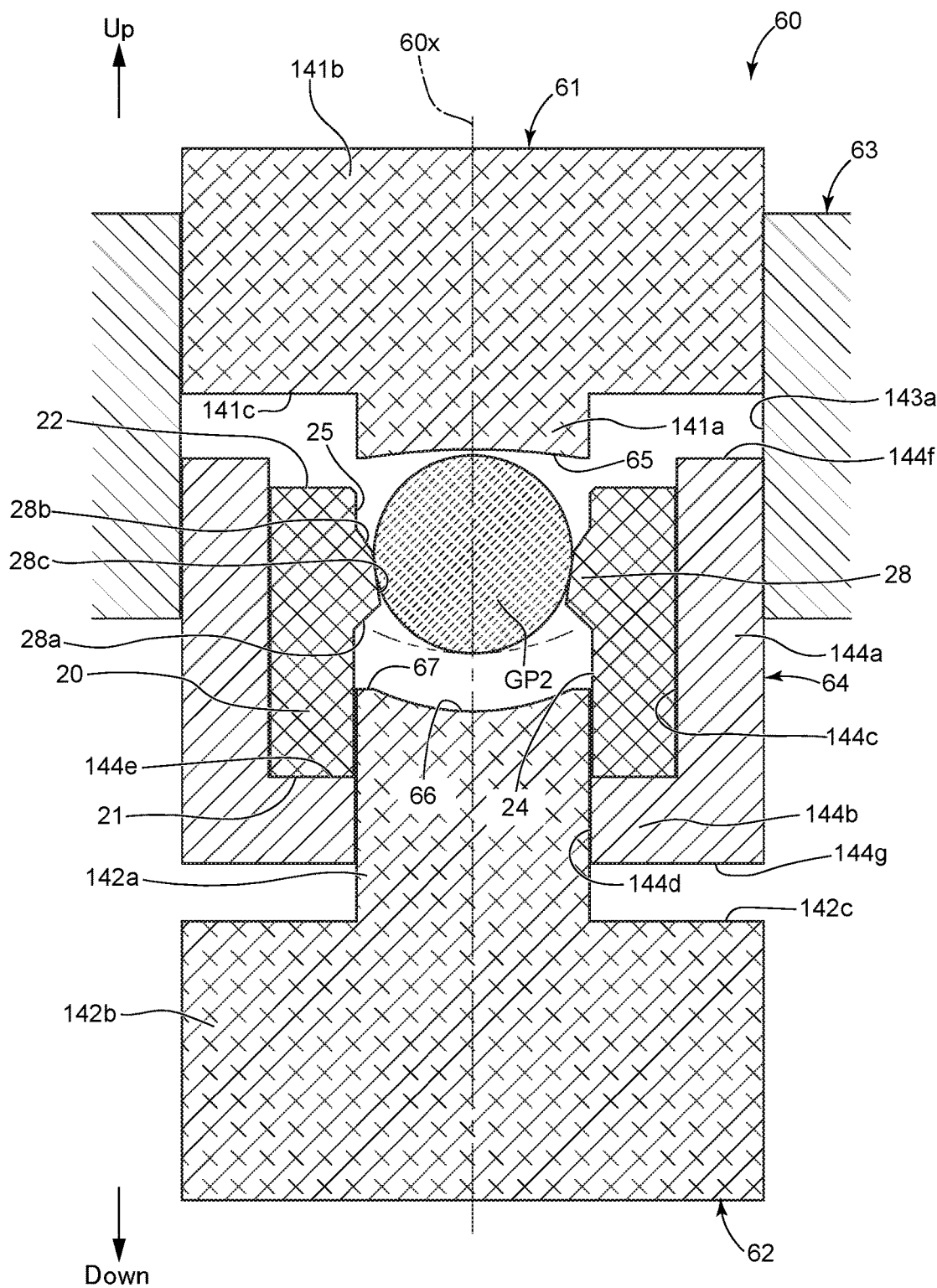
FIG. 20 is a cross-sectional view of a press-molding ready state for a lens element in a molding apparatus for manufacturing the lens unit according to the third embodiment.
Figure 21:
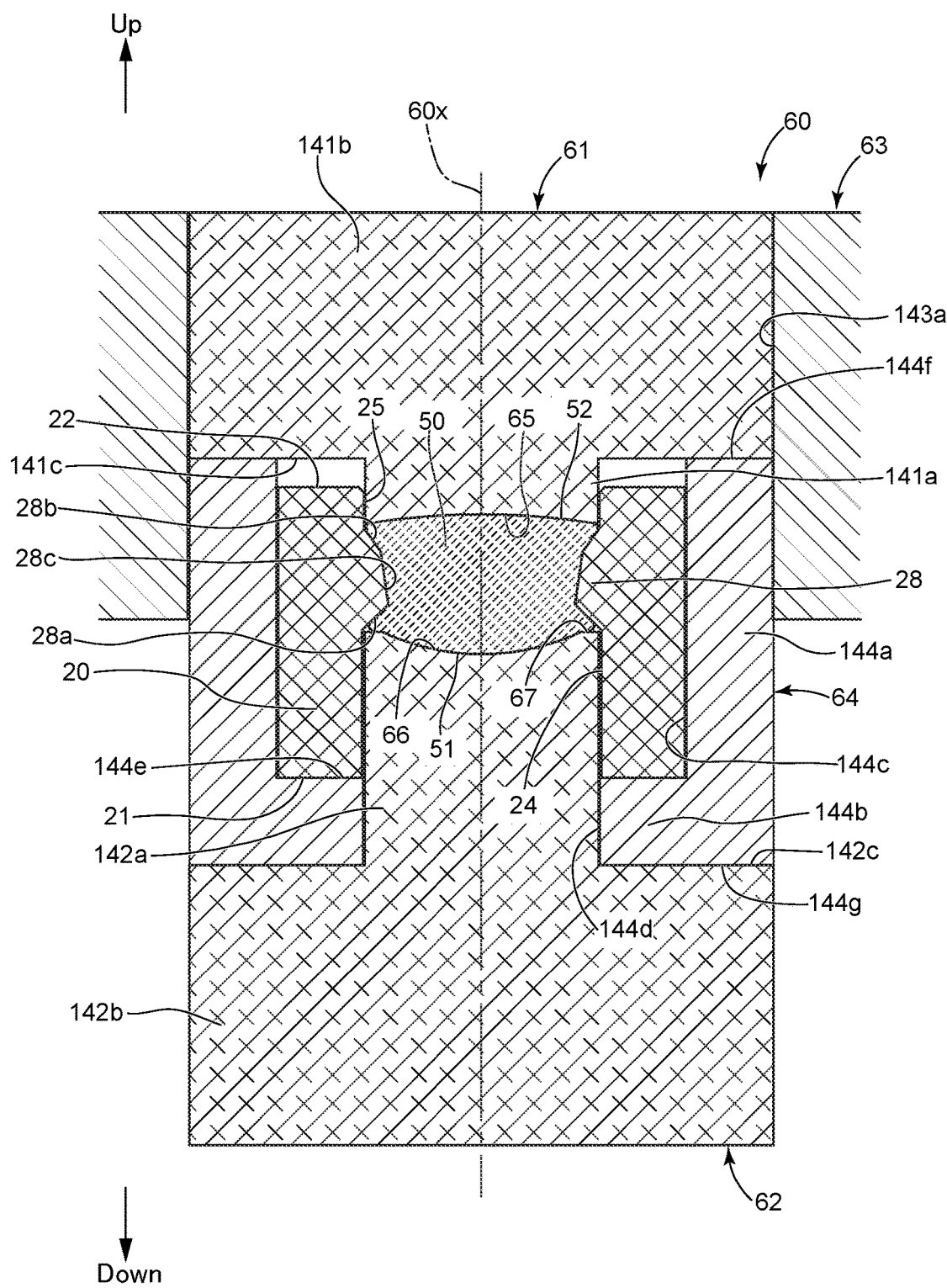
FIG. 21 is a cross-sectional view of a press-molding completion state of a lens element in the molding apparatus for manufacturing the lens unit according to the third embodiment.

A lens unit 2 and a manufacturing method (manufacturing apparatus) thereof according to a third embodiment is shown in FIGS. 19 through 21. The lens unit 2 according to the third embodiment uses a biconvex lens element 50 having a positive refractive power. In other words, the lens element 50 is provided with an incident surface 51, which is a convex surface convexing toward (protruding toward) the incident side, and an exit surface 52, which is a convex surface convexing toward (protruding toward) the exit side. The incident surface 51 has a larger curvature than that of the exit surface 52. An incident peripheral rim surface 53 is formed at a peripheral annular region of the incident surface 51. The incident peripheral rim surface 53 is approximately perpendicular (orthogonal) to an optical axis 50x of the lens element 50.

A projection 28 is formed inside the intermediate section 20C of the lens frame 20 instead of the projection 26 of the first embodiment. The projection 28 is continuously provided over the entire circumferential direction of the lens frame 20. The projection 28 has a shape (profile) which is reversed in the optical axis direction compared to that of the projection 26 of the first embodiment. Specifically, the projection 28 is provided with a first tapered surface 28a that connects with the exit end of the cylindrical surface 24, a second tapered surface 28b that connects with the incident end of the cylindrical surface 25, and a third tapered surface 28c connected between the first tapered surface 28a and the second tapered surface 28b.

The first tapered surface 28a has a progressively reduced inner diameter from the cylindrical surface 24 (the incident side) toward the exit side. The second tapered surface 28b has a progressively reduced inner diameter from the cylindrical surface 25 (exit side) toward the incident side. The third tapered surface 28c has a progressively reduced inner diameter from the second tapered surface 28b (exit side) toward the first tapered surface 28a (incident side).

In other words, the inclination direction of the third tapered surface 28c relative to the optical axis 50x of the lens element 50 is the opposite to that of the inclination direction of the third tapered surface 26c relative to the optical axis 10x in the first embodiment. Furthermore, reflection light rays that reflect off the third tapered surface 28c and travel toward the exit surface 52 not totally reflecting (total internal reflection does not occur) is also different from the first embodiment.

An outer peripheral portion of the lens element 50 is provided with an outer peripheral recess 54 that corresponds to the shape (profile) of the projection 28. The lens element 50 is fixed within the lens frame 20 with the projection 28 fixedly fitted into the outer peripheral recess 54.

In the same manner with the projection 26 of the first embodiment, the projection 28 has a function by which harmful light such as peripheral light that passes radially outside the effective light rays can be shielded (prevented from passing through the exit surface 52) while allowing (not shielding) the effective light rays passing within the effective aperture of the incident surface 51 and exiting within the effective aperture of the exit surface 52. Furthermore, due to the three tapered surfaces 28a, 28b and 28c of the projection 28 supporting the lens element 50, the joining strength, positional precision, load bearing and air-tightness, etc., between the lens element 50 and the lens frame 20 can be improved.

A press-molding apparatus 60 for press-molding the lens element 50 of the third embodiment is shown in FIGS. 20 and 21. Although the dimensions in the optical axis direction differ, the fundamental structures of an upper die 61, a lower die 62, a barrel die 63 and a barrel die 64 of the press-molding apparatus 60 are in common with the above-described upper die 41, the lower die 42, the barrel die 43 and the barrel die 44 of the press-molding apparatus 40, respectively. Accordingly, each component/part of the press-molding apparatus 60 that functions in a similar manner to that of the press-molding apparatus 40 is indicated in FIGS. 20 and 21 with an addition "1" added to the left side of the numerals corresponding to the those of the press-molding apparatus 40, and duplicate descriptions thereof have been omitted.

Similar to when the lens element 10 is press-molded in the first embodiment, when the lens element 50 is press-molded, the press-molding apparatus 60 is set so that a molding surface for forming a lens surface having a large convex curvature (a small radius of curvature) is provided on the lower die 62. In regard to the shape (profile) of the lens element 50, which is a biconvex lens element, since the incident surface 51 is a convex surface having a larger curvature than that of the exit surface 52, a molding surface 66 which forms incident surface 51 is provided on the lower die 62. Furthermore, a molding surface 65 which forms the exit surface 52, which is a convex surface having a smaller curvature than that of the incident surface 51, is provided on the upper die 61. Hence, in accordance with the difference in curvatures between the incident surface 51 and the exit surface 52, the molding surface 66 of the lower die 62 is concave surface having a larger curvature than that of the molding surface 65 of the upper die 61.

The orientation of the lens frame 20 when placed in the press-molding apparatus 60 is vertically opposite to the orientation of the lens frame 20 in the first embodiment. Namely, the incident end 21 is faced downward when the lens frame 20 is inserted into a receiving hole 144*c* of the barrel die 64. Thereafter, the incident end 21 come in contact with a restriction surface 144*e* of the barrel die 64, thereby determining the position of the lens frame 20 in the upward/downward direction.

With the lens frame 20 inserted into the receiving hole 144*c*, the upward-facing exit end 22 is positioned downward relative to the upper end surface 144*f* (below the upper end surface 144*f*). Furthermore, the inclination directions and angles, relative to the reference axis 60*x* of the press-molding apparatus 60, of the first tapered surface 28*a*, the second tapered surface 28*b*, and the third tapered surface 28*c* of the projection 28 are substantially the same as the inclination directions and angles of the second tapered surface 26*b*, the first tapered surface 26*a*, and the third tapered surface 26*c* of the projection 26, respectively, of the first embodiment shown in FIGS. 13 through 17.

Hence, a spherical shaped glass preform GP2 is inserted into the through-hole 23 of the lens frame 20, which is placed in the press-molding apparatus 60, from above (from the exit end (22) side). Alternatively, the lens frame 20 may be placed inside the press-molding apparatus 60 with the lens frame 20 already having the glass preform GP2 inserted into the through-hole 23 thereof. As shown in FIG. 20, the glass preform GP2 is placed on (rests on) the third tapered surface 28*c* of the projection 28 inside the lens frame 20. The third tapered surface 28*c*, the inner diameter thereof progressively reducing in a downward direction, can stably hold the glass preform GP2 with high precision. Furthermore, the press load of the upper die 61 against the glass preform GP2 and the weight of the glass preform GP2 itself are able to prevent the lens frame 20 from rising in the barrel die 64.

The upper die 61, which is movably-guided in the upward and downward directions via the barrel die 63, is provided with a molding surface 65 on the end (lower end) of a shaft portion 141*a*. As described above, the molding surface 65 is a concave surface having a shape corresponding to the exit surface 52 of the lens element 50.

The lower die 62, which is movably-guided in the upward and downward directions via the barrel die 64, is provided with the molding surface 66 on the end (upper end) of a shaft portion 142*a*. As described above, the molding surface 66 is a concave surface having a shape corresponding to the incident surface 51 of the lens element 50. Furthermore, an annular surface 67, having a shape corresponding to the incident peripheral rim surface 53 of the lens element 50, is formed around the periphery of the molding surface 66.

The glass preform GP2 is heated and softened inside the press-molding apparatus 60. From the press-molding ready state shown in FIG. 20, the upper die 61 and the lower die 62 are moved to close in the upward and downward directions. The shaft portion 142*a* of the lower die 62 moves upward into the through-hole 23 of the lens frame 20, and the molding surface 66 abuts against the lower portion of the glass preform GP2. The shaft portion 141*a* of the upper die 61 moves downward into the through-hole 23 of the lens frame 20, and the molding surface 65 comes in contact against the upper portion of the glass preform GP2. Thereafter, the glass preform GP2, sandwiched in between the molding surface 65 and the molding surface 66, is pressed and deformed in accordance with the shapes of the molding surface 65 and the molding surface 66.

Since the molding surface 66, which is a concave surface having a larger curvature than that of the molding surface 65, is at a lower position, when the glass preform GP2 is pressed downwards in the press-molding operation, the precision of the molding can be improved by suppressing positional deviation of the glass preform GP2.

The upper die 61 and the lower die 62 approach each other until a restriction surface 142*c* comes in contact with a lower end surface 144*g* of the barrel die 64 and is restricted from movement thereby, and a restriction surface 141*c* comes in contact with the upper end surface 144*f* of the barrel die 64, to thereby reach the press-molding completion state shown in FIG. 21 to obtain a press-molded lens element 50.

Figure 22:
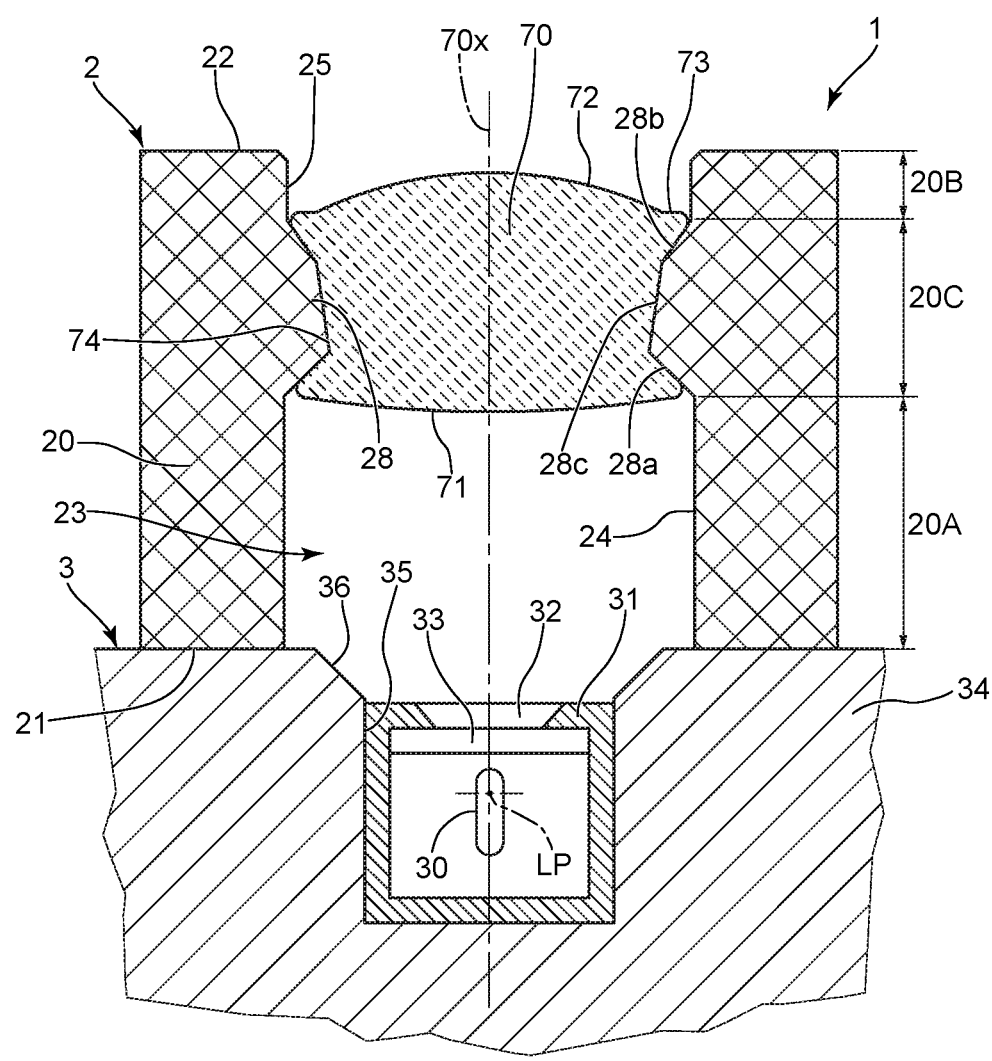
FIG. 22 is a cross-sectional view of main components of an optical device that is provided with a lens unit according to a fourth embodiment.
Figure 23:
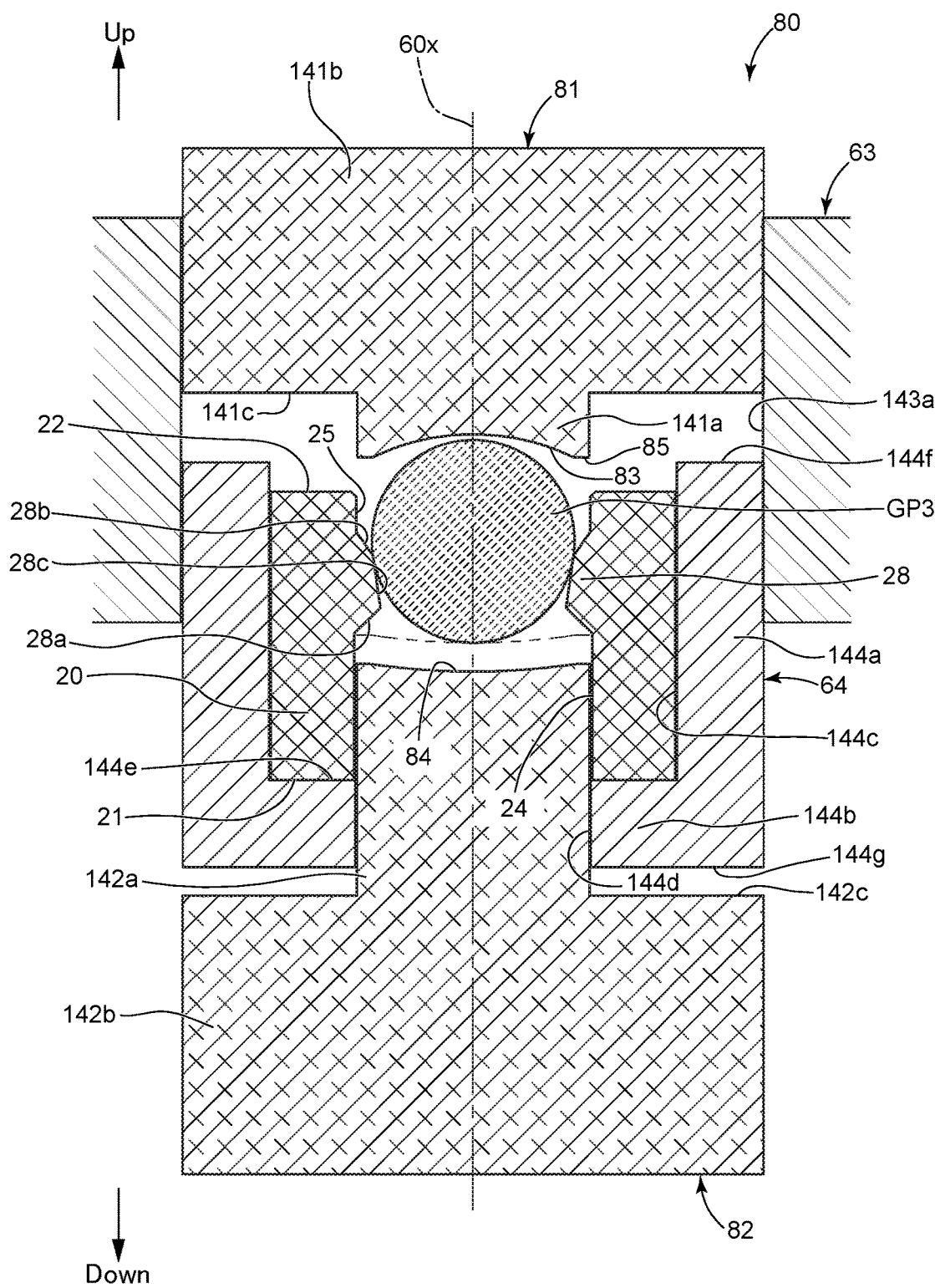
FIG. 23 is a cross-sectional view of a press-molding ready state for a lens element in a molding apparatus for manufacturing the lens unit according to the fourth embodiment.
Figure 24:
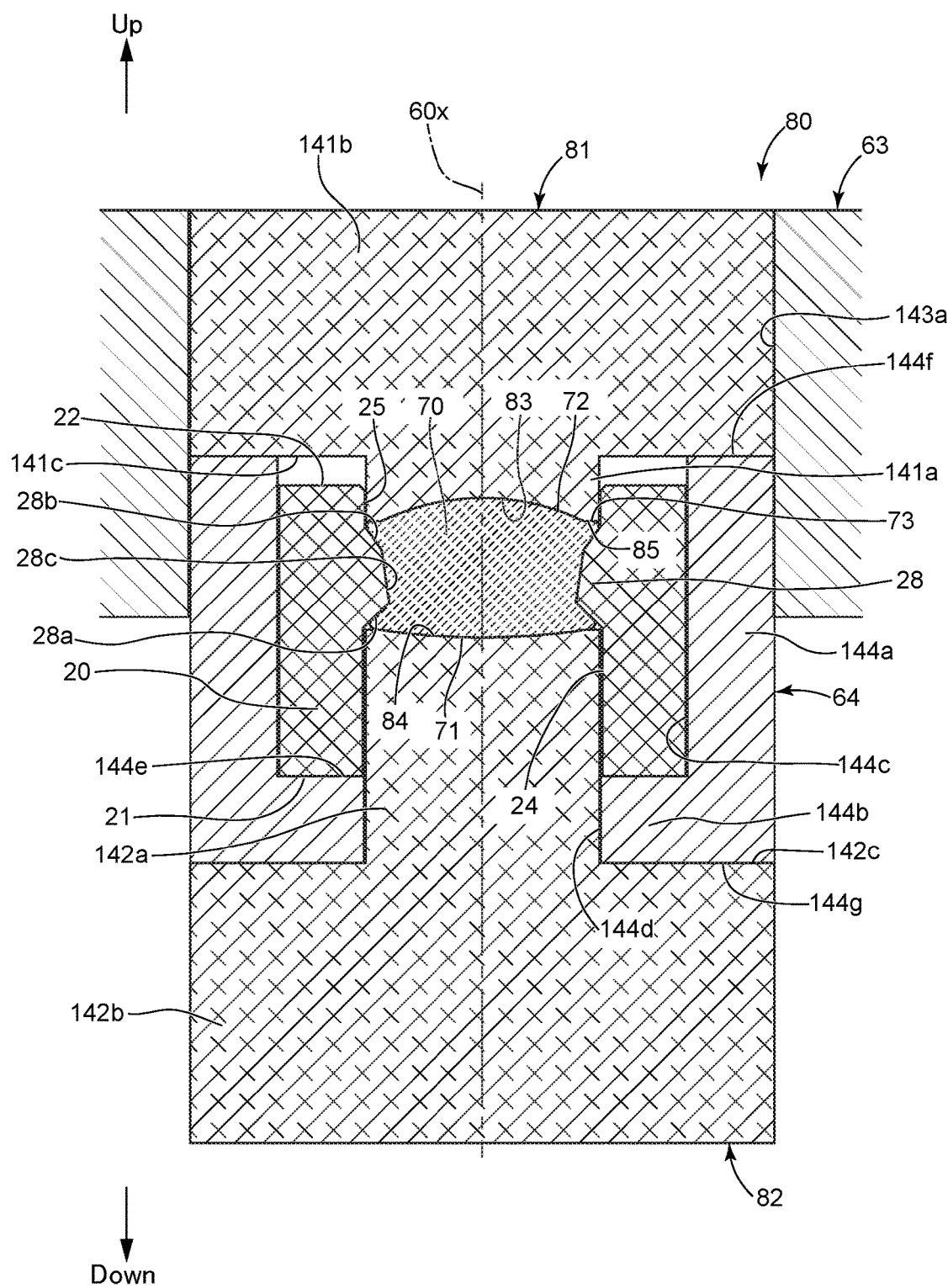
FIG. 24 is a cross-sectional view of a press-molding completion state of a lens element in the molding apparatus for manufacturing the lens unit according to the fourth embodiment.

A lens unit 2 and a manufacturing method (manufacturing apparatus) thereof according to a fourth embodiment is shown in FIGS. 22 through 24. The lens unit 2 according to the fourth embodiment uses a biconvex lens element 70 having a positive refractive power. The difference with the lens element 70 compared to the lens element 50 of the third embodiment is that an exit surface 72, which has a convex surface convexing toward the exit side, has a larger curvature (a smaller radius of curvature) than an incident surface 71, which has a convex surface convexing toward the incident side. An exit peripheral rim surface 73 is formed at a peripheral annular region of the exit surface 72. The exit peripheral rim surface 73 is approximately perpendicular (orthogonal) to the optical axis 70*x* of the lens element 70.

The structure of the lens frame 20 is the same as that of the third embodiment, and is likewise provided with a projection 28 formed on the inner side of the intermediate section 20C. The projection 28 is fixedly fitted into an outer peripheral recess 74 of the lens element 70 so that the lens element 70 is fixed within the lens frame 20.

A press-molding apparatus 80 for press-molding the lens element 70 of the fourth embodiment is shown in FIGS. 23 and 24. The press-molding apparatus 80 has a structure that is substantially the same as the press-molding apparatus 60 of the third embodiment. Components in the fourth embodiment that are in common with those of the third embodiment are indicated with the same numeral designators, and duplicate descriptions thereof have been omitted.

The press-molding apparatus 80 is provided with a molding surface 84 on a lower die 82 for molding the incident surface 71 of the lens element 70, and is provided with a molding surface 83 on an upper die 81 for molding the exit surface 72. Furthermore, an annular surface 85 is formed on the upper die 81 for forming the exit peripheral rim surface 73 on the lens element 70. In other words, the fourth embodiment differs from the press-molding apparatus 40 of the first embodiment and the press-molding apparatus 60 of the third embodiment by having a configuration in which instead of providing the molding surface 83 that forms the exit surface 72 (which has a large convex curvature) on the lower die 82, the molding surface 84 that forms the incident surface 71 (which has a small convex curvature) is provided on the lower die 82.

As shown in FIG. 23, the lens frame 20 is inserted into the receiving hole 144*c* of the barrel die 64 of the press-molding apparatus 80 with the incident end 21 of the lens frame 20 facing downward. Accordingly, the third tapered surface 28*c* of the projection 28 is oriented so that the smaller inner diameter thereof is positioned downward (so that the end of the third tapered surface 28c that has a smaller inner diameter than the other end, with respect to the optical axis direction, is positioned downward). Furthermore, a spherical shaped glass preform GP3 is placed on the third tapered surface 28c. The third tapered surface 28c, the inner diameter thereof progressively reducing in a downward direction, can stably hold the glass preform GP3 with high precision. Furthermore, the press load of the upper die 81 against the glass preform GP3 and the weight of the glass preform GP3 itself are able to prevent the lens frame 20 from rising in the barrel die 64.

The glass preform GP3 is heated and softened inside the press-molding apparatus 80. From the press-molding ready state shown in FIG. 23, the upper die 81 and the lower die 82 are moved to close in the upward and downward directions. The molding surface 84 of the lower die 82 comes in contact against the lower portion of the glass preform GP3, and the molding surface 83 of the upper die 81 comes in contact against the upper portion of the glass preform GP3. Thereafter, the glass preform GP3, sandwiched in between the molding surface 83 and the molding surface 84, is pressed and deformed in accordance with the shapes of the molding surface 83 and the molding surface 84.

The lower molding surface that is positioned underneath the glass preform GP3 during a press-molding operation is the molding surface 84 which is a concave surface having a smaller curvature than that of the molding surface 83. However, it should be noted that since the molding surface 84 is a concave surface, a certain effect of stabilizing the glass preform GP3 can be obtained compared to the case where the lower molding surface is a convex surface or a flat surface.

The upper die 81 and the lower die 82 approach each other until a restriction surface 142c comes in contact with a lower end surface 144g of the barrel die 64 and is thereby restricted from further movement, and a restriction surface 141c comes in contact with the upper end surface 144f of the barrel die 64, to thereby reach the press-molding completion state shown in FIG. 24 to obtain a press-molded lens element 70.

As described above, each lens unit 2 according to each illustrated embodiment can exhibit improvements in positional precision, joining strength, load bearing and air-tightness between the lens frame 20 and the lens element 10, the lens element 50 or lens element 70. Furthermore, an improvement in optical performance can be achieved by preventing harmful light rays using the simple structure of the projection 26 or the projection 28 of the lens frame 20.

Furthermore, by using the third tapered surface 26c (or 28c) provided on the projection 26 (or 28) of the lens frame 20, the support precision between the lens frame 20 and the glass preform GP1 (or GP2 or GP3) during the press-molding operation in the press-molding apparatus 40 (or 60 or 80) can be increased and the productivity can be improved.

As described above in regard to the press-molding apparatus 40 and the press-molding apparatus 60, a further improvement in productivity can be achieved by forming the molding surface on the lower die with a concave surface having a larger curvature compared to that of the molding surface formed on the upper die.

However, the present invention is not limited to the above-described embodiments of this disclosure, various modification may be made without departing from the scope of the present invention.

Although in the above-described embodiments the lens element (10, 50 or 70) provided in the lens unit 2 is either a plano-convex lens element or a biconvex lens element, the lens profile of the lens element is not limited thereto. For example, the present invention may also be applied to a meniscus lens element having a positive refractive power. In such a case, it is desirable to provide the molding surface for forming the convex surface of the meniscus lens element in the lower die of the press-molding apparatus.

The projection 26 (28) in the lens frame 20 of the above-illustrated embodiments is provided continuously around the entire circumference of the lens frame 20 centered about the optical axis 10x (50x, 70x) of the lens element 10 (50, 70). Such a structure is advantageous for achieving strength, light-shielding ability and air-tightness.

However, the projection of the lens frame may be alternatively provided with partial (discontinuous) projections in the circumferential direction about the optical axis instead of the entire inner circumference of the lens frame 20.

The projection 26 (28) of the lens frame 20 in the above-described embodiments is provided with three tapered surfaces at different positions with respect the optical axis direction. Namely, the intermediate portion (with respect the optical axis direction) of the 26 (28) is provided with only the third tapered surface 26c (28c) having a constant inclination. Such a structure is simple, facilitates the manufacture of the lens frame 20, and is also advantageous for attaining higher precision. However, it is also possible to provide two or more tapered surfaces in the intermediate portion (a portion that corresponds to the third tapered surface 26c (28c)) of the projection of the lens frame; these two tapered surfaces, having different inclination angles and inclination directions, being continuously formed with respect to the optical axis direction. In other words, the projection of the lens frame of the present invention may be provided with not less than four tapered surfaces along the optical axis direction.

Obvious changes may be made in the specific embodiments of the present invention described herein, such modifications being within the spirit and scope of the invention claimed. It is indicated that all matter contained herein is illustrative and does not limit the scope of the present invention.

What is claimed is:
1. A lens unit comprising:
a lens element provided with a convex surface on at least one of an incident surface and an exit surface of the lens element, the lens element having a positive refractive power that condenses light rays, emitting from a light source, at a predetermined position; and
a lens frame that supports the lens element within the lens frame, the lens frame provided with a projection that projects in an inner radial direction from an inner portion of the lens frame,
wherein the lens frame supports the lens element with the projection fixedly fitted into an outer peripheral portion of the lens element,
wherein the projection is provided, on an inner peripheral portion thereof, with a first surface positioned on an incident side in an optical axis direction of the lens element, a second surface positioned on an exit side in the optical axis direction, and a third surface positioned between the first surface and the second surface, and
wherein the first, second and third surfaces are tapered surfaces that are respectively obliquely inclined relative to the optical axis direction and progressively vary the inner diameter of the lens frame in the optical axis direction.

2. The lens unit according to claim 1, wherein light rays that are incident from the incident surface and reflect off the third surface are totally reflected by the exit surface.

3. The lens unit according to claim 1, wherein the third surface has a progressively reduced inner diameter toward a surface having a largest convex curvature out of the incident surface and the exit surface.

4. The lens unit according to claim 1, wherein the first surface has a progressively reduced inner diameter from the incident surface to the exit surface,
- wherein the second surface has a progressively reduced inner diameter from the exit surface to the incident surface,
- wherein the third surface has a progressively reduced inner diameter from the incident surface to the exit surface, and
- wherein an inclination of the third surface relative to the optical axis direction is different from that of the first surface.

5. The lens unit according to claim 1, wherein the first surface has a progressively reduced inner diameter from the incident surface to the exit surface,
- wherein the second surface has a progressively reduced inner diameter from the exit surface to the incident surface,
- wherein the third surface has a progressively reduced inner diameter from the exit surface to the incident surface, and
- wherein an inclination of the third surface relative to the optical axis direction is different from that of the second surface.

6. The lens unit according to claim 1, wherein the lens frame is provided, on an inner surface thereof, with a reflection control portion between the light source and the lens element with respect to the optical axis direction,
- wherein light rays from the light source are reflected by the reflection control portion and travel toward the projection.

* * * * *